United States Patent [19]

Inada et al.

[11] Patent Number: 5,311,169

[45] Date of Patent: May 10, 1994

[54] METHOD AND APPARATUS FOR DRIVING CAPACITIVE DISPLAY DEVICE

[75] Inventors: Shuji Inada; Ikuo Ogawa; Toshihiro Ohba; Hiroshi Kishishita, all of Nara; Hisashi Uede, Wakayama, all of Japan

[73] Assignee: Sharp Kabushiki Kaisha, Osaka, Japan

[21] Appl. No.: 735,763

[22] Filed: Jul. 26, 1991

Related U.S. Application Data

[63] Continuation of Ser. No. 282,049, Dec. 9, 1988, abandoned.

[30] Foreign Application Priority Data

Jun. 7, 1988 [JP] Japan .................. 63-139638
Jul. 2, 1988 [JP] Japan .................. 63-165561
Jul. 18, 1988 [JP] Japan .................. 63-179997
Jul. 18, 1988 [JP] Japan .................. 63-179998

[51] Int. Cl.$^5$ .............................. C09G 3/30
[52] U.S. Cl. ..................... 340/781; 340/793
[58] Field of Search .......... 340/781, 760, 767, 793, 340/812, 813

[56] References Cited

U.S. PATENT DOCUMENTS 4,554,539  11/1985  Graves ..................... 340/793
4,755,724   7/1988  Wagner .................... 340/805
4,801,933   1/1989  Yamamoto et al. ........... 340/784
4,837,566   6/1989  Channing et al. ........... 340/781
4,897,639   1/1990  Kanayama ................... 340/812
5,017,914   5/1991  Uchida et al. ............. 340/793

FOREIGN PATENT DOCUMENTS 0106550  4/1984  European Pat. Off.
0187347  7/1986  European Pat. Off.
2165078  4/1986  United Kingdom.

OTHER PUBLICATIONS

Gielow et al. article entitled: "Multiplex Drive of a Thin Film Panel"; SID 84 Digest; pp. 242-244.

Primary Examiner—Jeffery A. Brier

[57] ABSTRACT

This invention relates to gradation display by a pulse width control method (PWM method) in every pixel in a capacitive display apparatus such as a liquid crystal display apparatus. The driving voltage applied to the electrodes is varied slowly, and the number of gradations of gradation display by the PWM method is increased. Since the capacitive display apparatus is used, for each electrode further from the drive circuit, the driving pulse is more influenced and its persisting duration is extended. As a result, even in identical gradation data, uneven colors may occur. The pulse width applied to the electrodes is gradually decreased as scanning of the electrodes sequentially occurs. Therefore, the brightness of the capacitive display apparatus may be made uniform over the entire screen surface.

15 Claims, 18 Drawing Sheets

*Prior Art*
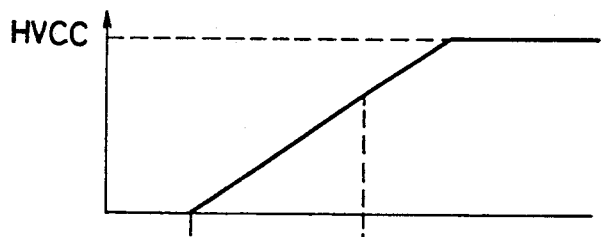
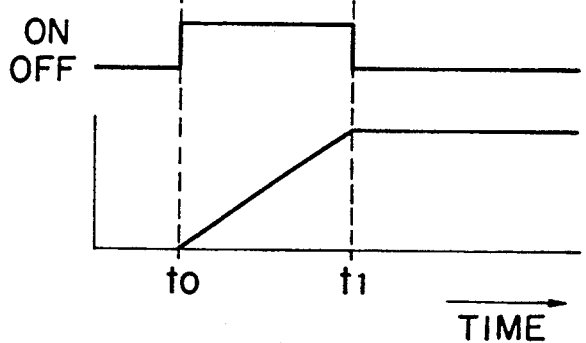

Prior Art
Fig.5 (1)
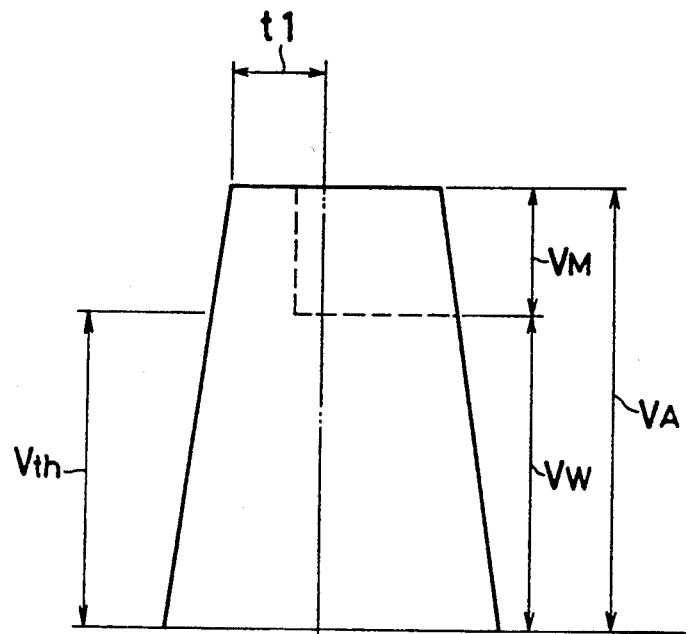
Fig.5 (2)
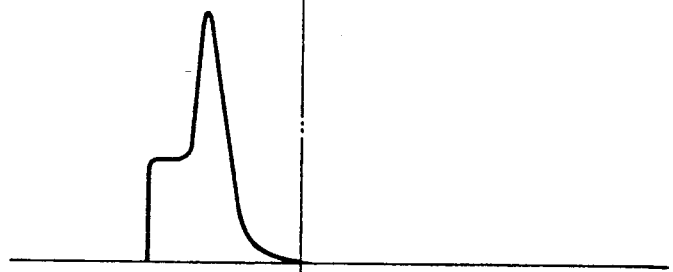
Fig.5 (3)
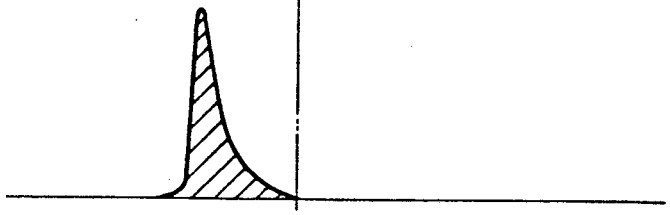

Prior Art
Fig. 7 (1)
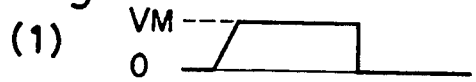
Prior Art
Fig. 8 (1)
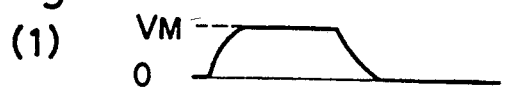
Fig. 7 (2)
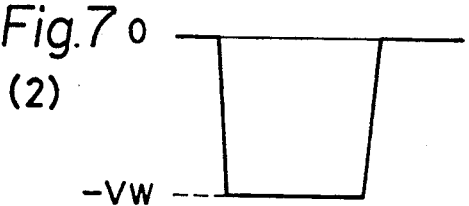
Fig. 8 (2)
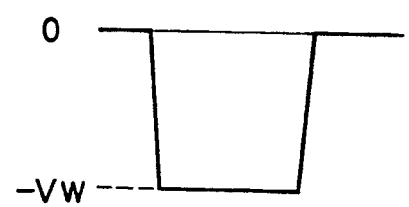
Fig. 7 (3)
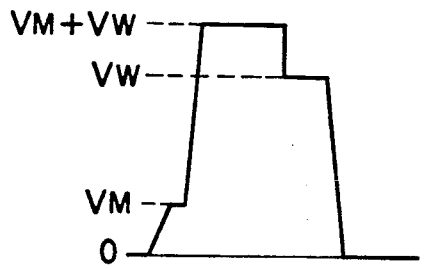
Fig. 8 (3)
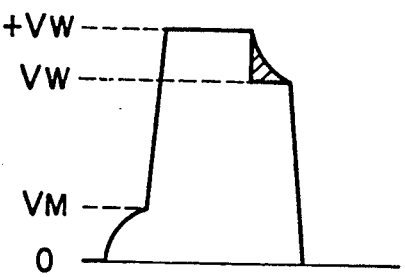

Fig.11 (3) V_M   HVCC

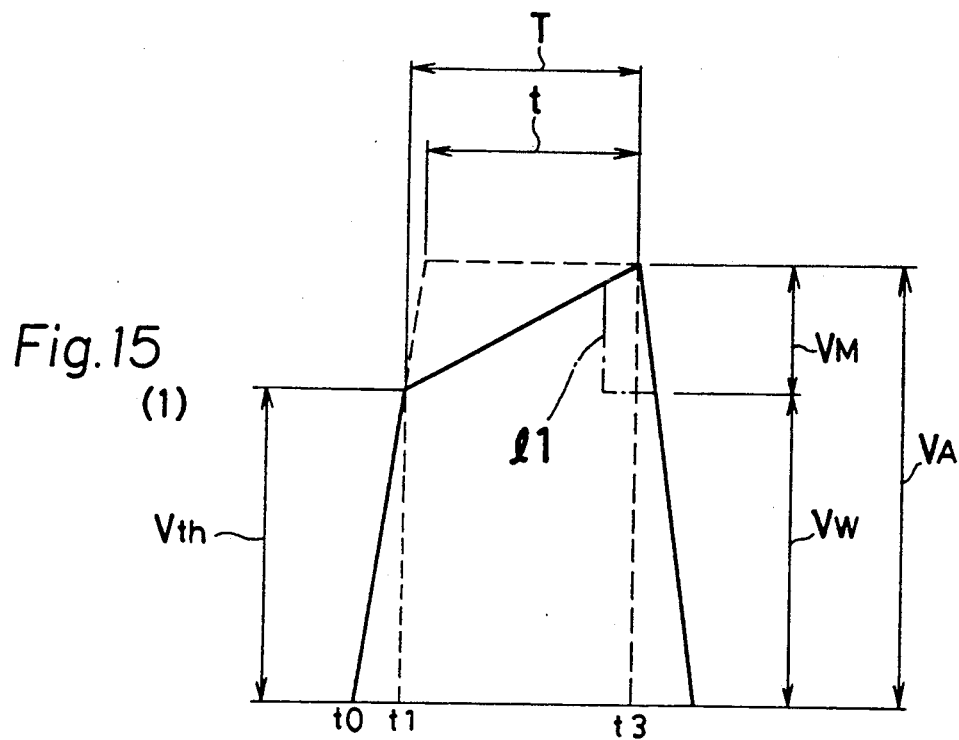
Fig.15 (1)
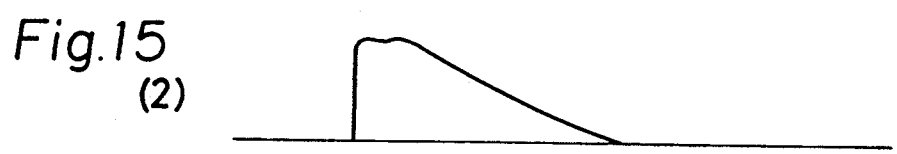
Fig.15 (2)
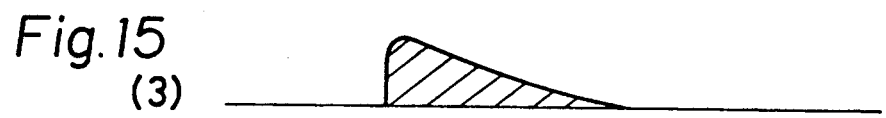
Fig.15 (3)

Fig.17
(1) $\overline{CLR}$
Fig.17
(2) CLK2
Fig.17
(3) X1
Fig.17
(4) X2
Fig.17
(5) Xn-1
Fig.17
(6) Xn
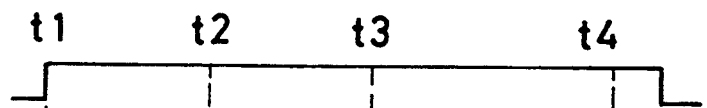
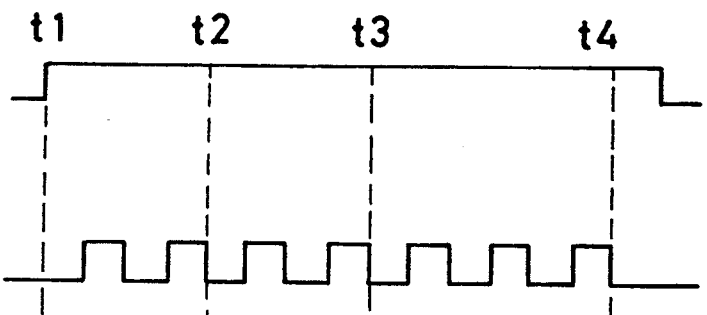
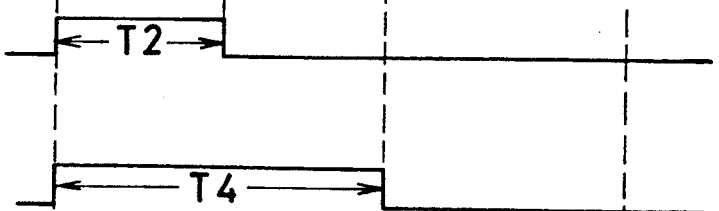
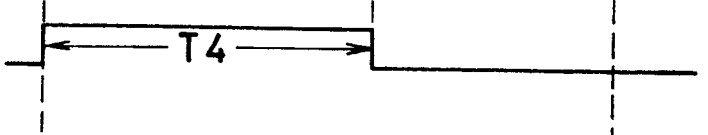
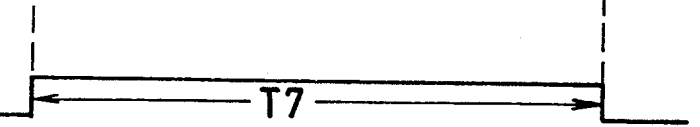

Fig. 18
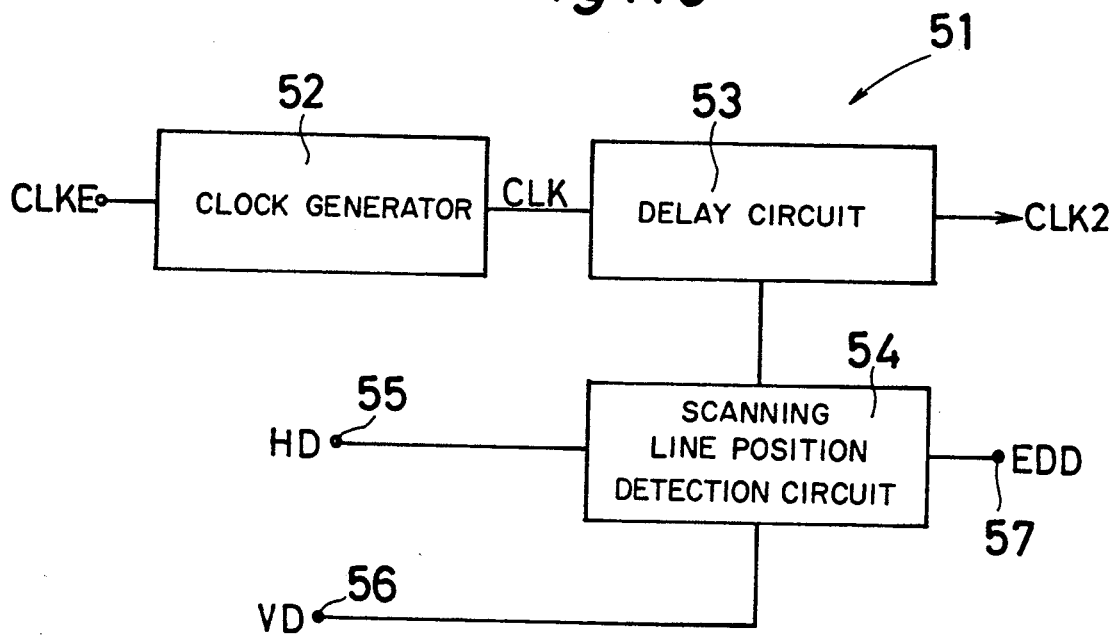
Fig.19
(1) CLK
Fig.19
(2) CLK2
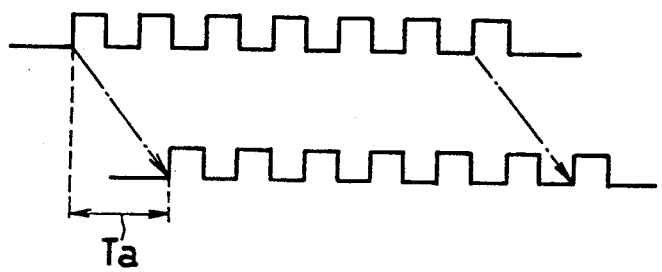

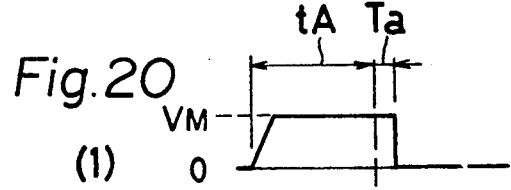
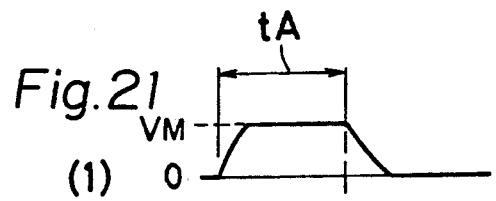
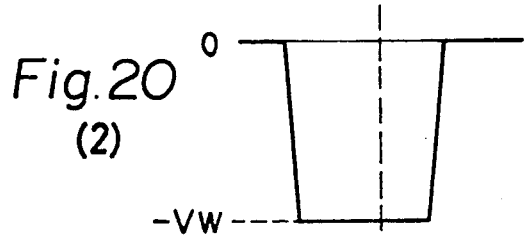
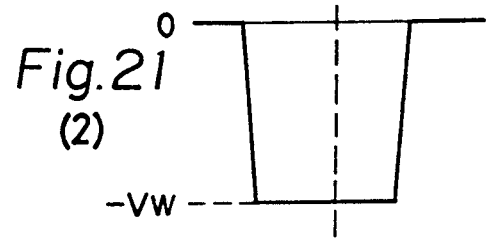
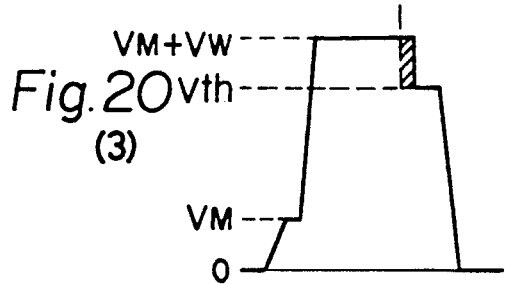
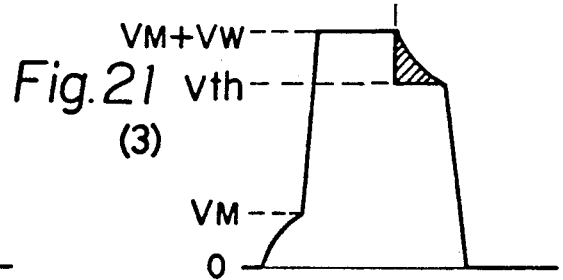

Fig.24(1) CLK
Fig.24(2) EVEN-CLK2
Fig.24(3) ODD-CLK2

METHOD AND APPARATUS FOR DRIVING CAPACITIVE DISPLAY DEVICE

This application is a continuation of application Ser. No. 07/282,049 filed on Dec. 9, 1988, now abandoned.

BACKGROUND OF THE INVENTION

1. Field of the Invention

This invention relates to drive method and drive apparatus for gradation display of each pixel in a capacitive display device such as electroluminescence (EL) display device.

2. Description of the Prior Art

For instance, a double insulation type (or triple insulation structure) thin film EL element is composed as follows.

As shown in FIG. 1, strips of transparent electrodes 2 made of $IN_2O_3$ are disposed parallel on a glass substrate 1, and an inductive substance layer 3a of $Y_2O_3$, $Si_3N_4$, $Al_2O_3$ or the like, an EL layer made of ZnS doped with activator such as Mn, and a similar inductive substance layer 3b of $Y_2O_3$, $Si_2N_4$, $TiO_2$, $Al_2O_3$ or the like are sequentially laminated thereon in a film thickness of 500 to 10000 Å by thin film technique such as evaporation or sputtering method. Thereby, a three-layer structure is composed strips of back electrodes 5 made of Al are then disposed parallel thereon in a direction orthogonal to the transparent electrodes 2.

Such a thin film EL element has the EL substance 4 sandwiched between the inductive substances 3a, 3b placed between its electrodes. It may be regarded as a capacitive element from the viewpoint of equivalent circuit. Further, as is clear from the voltage-brightness curve shown in FIG. 2, this thin film EL element is driven by applying a relatively high voltage of about 200 V. This thin film EL element emits light at a high brightness by an AC electric field, and has a long life.

The basic display drive of the thin film EL display apparatus using such a thin film EL element as a display panel is achieved by applying a writing voltage sequentially to the scanning side electrodes, along with a modulation voltage corresponding to the display data to determine emission and non-emission applied to the data side electrodes. This is achieved by using one of the transparent electrodes 2 and back electrodes 5 of the thin film EL element as scanning side electrodes, and the other ones as data side electrodes. By this display drive, the superimposing effect or canceling effect of the writing voltage and modulating voltage occurs at the intersecting pixel area of the scanning side electrode and data side electrode of the EL layer, and a voltage over the emission start voltage or a voltage under the emission start voltage is applied. Thereby, each pixel is set in emission state or non-emission state, so that a desired display is obtained.

Conventionally, in such thin film EL display apparatus, as a method of driving a gradation display for varying the brightness of each pixel in a plurality stages, the voltage modulation method of variably setting the modulation voltage to be applied to the data side electrode depending upon gradation display data (brightness data), has been known.

FIG. 3 is a circuit diagram showing one output port of the data side driver circuit of a thin film EL display apparatus intended to display in gradation by driving according to the voltage modulation method mentioned above, and FIG. 4 is a timing chart showing the operation of the same circuit. In FIG. 3, an input terminal 6 is a terminal for receiving a ramp waveform voltage $V_{RA}$ as shown in FIG. 4 (1). This input terminal 6 is connected to one of the terminals of a capacitor 8 through a switch 7, while the other terminal of the capacitor 8 is grounded. The connecting point of the switch 7 and capacitor 7 is connected to each gate of an N-channel MOS transistor 9 and a P-channel MOS transistor 10.

The drain of the N-channel MOS transistor 9 is connected to a power supply 11 for feeding a voltage HVCC corresponding to the maximum of modulation voltage applied to the data side electrode, the source of the transistor 9 is connected to the source of the P-channel MOS transistor 10, and the drain of the transistor 10 is grounded. The connecting point of the source of N-channel MOS transistor 9 and the source of the P-channel MOS transistor 10 is connected to an output terminal 12.

In the thus composed data side drive circuit, when a ramp waveform voltage $V_{RA}$ shown in FIG. 4 (1) begins to be applied to the input terminal 6, the switch 7 is turned on at the same time. The ON duration of the switch 7 is set according to the gradation display data mentioned above. While the switch 7 is being turned on, an electric current flows into the capacitor 8, and the capacitor 8 is charged to a voltage depending on the ON duration of the switch 7 (from time $t_0$ to $t_1$ in FIG. 4), that is, the gradation display data. This charging voltage is applied to the gate, the N-channel MOS transistor 9 is turned on, the P-channel MOS transistor 10 is turned off, and the output terminal 12 delivers an output voltage as shown in FIG. 4 (3), corresponding to the charging voltage of the capacitor 8, or the modulation voltage Vm corresponding to the gradation display data. This modulation voltage Vm is applied to the data side electrode, and by the difference in this modulation voltage Vm, the brightness of the corresponding pixel varies, and gradation display is effected.

In this drive method, however, the N-channel MOS transistor 9 is not always turned on in saturated state, but the ON resistance varies with the voltage applied to the gate, or the gradation display data, and hence it is a considerably high value. On the other hand, the thin film EL element is a large-sized capacitive display element, and the quantity of current flowing per channel (a circuit for one pixel) in the drive circuit is large, and the heat loss at the N-channel MOS transistor 9 becomes very significant. It is hence difficult to integrate the transistors when composing a drive circuit in an integrated circuit. Further, in the manufacturing process of the integrated circuit, since the P-channel MOS transistor and N-channel MOS transistor of high voltage resistance must be assembled, the manufacturing cost of integrated circuit is very high, which has made it hard to realize practically.

Further, in such thin film EL display apparatus, as a drive method of gradation display for varying the brightness of pixels in plural stages, the pulse width modulation method for varying the pulse width of the modulation voltage applied to the data side electrode depending on the gradation display data (brightness data) and controlling the time-wise integrated value of the effective voltage applied to the pixels is considered.

In this drive method, however, the gradation brightness is not stable as mentioned below, and many stages of gradation cannot be set.

FIG. 5 (1), (2), (3) are an applied voltage waveform to pixels in one presupposed pulse width modulation method, a waveform of power supply current at this time, and a waveform of current flowing in the emission layer of pixels, displayed to explain the causes of such problems.

As shown in FIG. 5 (1), the effective voltage $V_A$ applied to a pixel is obtained as a superimposed value of the modulation voltage $V_M$ applied to the data side electrode. Further, a writing voltage $V_W$ is applied to the scanning side electrode in the reverse polarity of the modulation voltage $V_M$ and in a magnitude corresponding to the emission threshold voltage Vth. When the effective voltage $V_A$ of such a rectangular wave is applied to a pixel, the waveform of the power supply current that becomes as shown in FIG. 5 (2).

That is, while the effective voltage $V_A$ does not achieve the emission threshold voltage Vth, a nearly constant current not contributing to the emission flowing in the capacitive portion of pixel flows. Further, when the effective voltage $V_A$ exceeds the emission threshold voltage Vth, the current portion flowing in the emission layer of pixel that is, the current portion contributing to emission is added in addition to the current portion flowing in the capacitive component of the pixel, and the current flowing in the emission layer becomes that as shown in FIG. 5 (3). The emission brightness of pixels becomes larger in proportion to the current quantity of the current flowing in the emission layer.

Here, when the pulse width of the modulation voltage $V_M$ is limited as indicated by broken line in FIG. 5 (1), the current flowing in the emission layer is shut off at the fall point of the modulation voltage $V_M$. That is, by limiting the pulse width of the modulation voltage $V_M$, the quantity of current flowing in the emission layer of the pixel is controlled. Thus, a brightness corresponding to the pulse width of modulation voltage $V_M$ is obtained.

As mentioned above, however, when the effective voltage $V_A$ applied to pixels is a rectangular wave, that is, when the modulation voltage $V_M$ is a rectangular wave, the current flowing in the emission layer becomes a peak current, and its passing time is short (as indicated by t1 in FIG. 5 (1)). Thus, the pulse width of the modulation voltage $V_M$ cannot be set in multiple stages. This means that it is impossible to control the brightness in mutilple stages. Besides, at the brightness of each stage, since the current flowing in each emission layer becomes large, only a slight error in the pulse width of the modulation voltage $V_M$ may result in a large change in the brightness. This makes it difficult to stabilize the gradation of brightness.

In this drive method, for example, when transparent electrodes of high line resistance are used as data side electrode, the modulation voltage applied to the data side electrodes is affected by the line resistance, and a brightness difference occurs among pixels as described below.

FIG. 6 is a connection diagram of display panel 13 of a thin film EL display apparatus and part of its drive circuit, presented to explain the cause of such brightness difference. In FIG. 6, the data side electrodes 14a, 14b are connected with output ports 15a, 15b of the data side drive circuit for applying modulation voltage $V_M$ to these data side electrodes 14a, 14b, at the electrode end parts drawn out to the upper side in the drawing. On the other hand, a plurality of scanning side electrodes 16a, 16b, 16c, 16d are disposed mutually parallel in a direction orthogonal to the data side electrodes 14a, 14b. These scanning side electrodes 16a to 16d are respectively connected with output ports 17a, 17b, 17c, 17d of scanning side drive circuit for applying writing voltage $-V_W$ to them, at the electrode end parts drawn out to the left side in FIG. 6. In FIG. 6, meanwhile, intermediate line resistances of the data side electrodes 14a, 14b are indicated by resistance R.

In the thus composed thin film EL display apparatus, a writing voltage $-V_W$, for example, corresponding to an emission threshold voltage Vth, is applied to the scanning side electrode 17a in order to emit two pixels 18A, 18D positioned on the data side electrode of an equal brightness, and the same writing voltage $-V_W$ is applied to the scanning side electrode 17d. Further, let us suppose in the example, that voltages of the same waveform are applied as modulation voltage $V_M$ applied from the output port 15a of the data side drive circuit to the data side electrode 14a.

At the pixel or picture element 18A at a position near the output port 15a, since the line length of the data side electrode 14a from the output port 15a to the pixel 18A is short, the effect of the line resistance is almost negligible. Therefore a voltage of nearly the same waveform as the modulation voltage $V_M$, delivered from the output port 15A as shown in FIG. 7 (1), is applied to the pixel 18A. At this time, when a writing voltage $-V_M$ in the waveform as shown in FIG. 7 (2) is applied from the output port 17a of the scanning side drive circuit to the scanning side electrode 16a, an effective voltage in the waveform as shown in FIG. 7 (3) is applied to the pixel 18A.

By contrast, at the pixel 18D remote from the output port 15a, the line length of the data side electrode 14a from the output port 15a to the pixel 18D is long, the line resistance R in this length is large, and the modulation voltage $V_M$ is greatly affected by the line resistance R. Therefore, as shown in FIG. 8 (1), a voltage in an integral waveform, as if passing the modulation voltage $V_M$ delivered from the output port 15a into an integrating circuit, is applied to the pixel 18D. At this time, when a writing voltage $-V_W$ in the waveform as shown in FIG. 8 (2) is applied from the output port 17d of the scanning side drive circuit to the scanning side electrode 16d, an effective voltage in the form as shown in FIG. 8 (3) is applied to the pixel 18D.

Of the effective voltages applied to the pixels 18A, 18D, the voltage substantially contributing to the emission is the portion over the emission threshold voltage. Therefore, when the waveform in FIG. 7 (3) and the waveform in FIG. 8 (3) are compared with respect to the portion over the emission threshold voltage Vth, the waveform in FIG. 8 (3) is wider in the area by the shaded area portion. This area difference becomes a direct difference in the brightness, and between the pixels 18A, 18D, although it was intended to emit in the same brightness, the pixel 18D is actually brighter than the pixel 18A.

That is, if modulation voltage $V_M$ of an identical waveform is applied, the pixel closer to the output port is darker. Thus, the remoter one is brighter, and the brightness fluctuates, and when the brightness difference occurs between pixels adjacent vertically which should be identical in gradation, the display quality deteriorates.

SUMMARY OF THE INVENTION

It is hence a primary object of this invention to present a drive method and drive device of a capacitive display apparatus capable of displaying in gradations at low cost by simplifying the manufacturing process, while keeping heat generation low, relating to a capacitive display apparatus.

It is hence a second object of this invention to present a drive method and drive apparatus of a capacitive display device capable of displaying in multiple stages of gradation and also displaying gradation of each stage stably, relating to driving of a capacitive display apparatus.

It is hence a third object of this invention to present a drive method and drive apparatus of a capacitive display device capable of emitting pixels of a uniform brightness to identical gradation display data, without being affected by the line resistance of data side electrode.

To achieve the above objects, this invention realizes a method for driving capacitive display device sandwiching a capacitive display layer between plural scanning electrodes and plural data electrodes arranged in mutually intersecting directions, by applying data pulses corresponding to display data to the data electrodes, and by applying writing pulses to the scanning electrodes sequentially in which:

the voltage of the pulse signals is selected at a value above the lower limit capable of emitting light of the display device, the pulse width of the data pulse being determined in correspondence with the identifying data of the scanning electrodes possessing levels varying in the scanning sequence.

This invention further relates to a method for driving capacitive display device, in which a capacitive display layer intervenes between plural scanning electrodes and plural data electrodes arranged in mutually intersecting directions, and data pulses are applied to the data electrodes, while writing pulses are applied to the scanning electrodes in the sequence of the scanning electrodes, and the data pulses to be applied to the data electrodes have the waveforms gradually increasing in the level in the rising period.

This invention furthermore presents an apparatus for driving capacitive display device comprising:

a capacitive display device composed between a pair of electrodes by means of an intervening capacitive display layer, a DC power supply, impedance converting means possessing an impedance corresponding to the level of a control signal and intervening in series between the DC power supply and electrodes, control signal generating means for generating the control signal sequentially varying in the level along with the passing of the time within a predetermined period, and applying the control signals to the impedance converting means, and switching means for applying a current to the capacitive display device only for the time corresponding to the gradation in each period, and cutting of the current for the remaining time in each period.

In a preferred embodiment, the impedance converting means and/or the switching means is composed of transistors having an N-channel metal oxide semiconductor.

In another preferred embodiment, the control signal generating means generates control signals increasing in voltage level along with the passing of the time, and the impedance converting means is selected to possess the characteristic of decreasing in the impedance along with the increase in the voltage level of the control signal.

This invention also relates a method for driving capacitive display device, in which a capacitive display layer intervenes between plural scanning side electrodes and plural data side electrodes arranged in mutually intersecting directions, and data pulses varied in pulse width corresponding to the display data are applied to the data electrodes from one side of the arrangement direction, while writing pulses are applied to the scanning electrodes sequentially, and the pulse width of the data pulses applied to the data electrodes is sequentially changed along the scanning sequence of the scanning electrodes, and the degree of such change is selected so that picture elements corresponding to same display data may be identical in brightness.

In a further preferred embodiment, the sequential change of the pulse width is attained by varying the phase of the clock signal, in response to the scanning sequence of the scanning electrode, with respect to the clock signal for defining the operation for sequentially applying the data pulses to data side electrodes.

This invention still more presents an apparatus for driving a capacitive display device comprising:

a capacitive display apparatus possessing plural first electrodes to be scanned, second electrodes disposed individually opposing the first electrodes and commonly connected, and a capacitive display layer intervening between the first electrodes and second electrodes, first electrodes driving means for scanning by periodically applying predetermined first potential sequentially to the first electrodes of the capacitive display apparatus, and second electrode driving means possessing a pulse width persisting for a driving period corresponding to a predetermined gradation in the second electrodes, and leading out a predetermined second potential of which the potential difference from the first electrodes is to activate the capacitive display layer, in which the persisting period is set so that the persisting period when each second electrode is at a position remote from the second electrode driving means is shorter than the persisting period in the second electrodes at a position closer to the second driving means, in each gradation.

In a preferred embodiment, the second electrode driving means varies the pulse width from shorter as to longer so that the gradation of plural electrodes may be approximated as predetermined.

This invention moreover presents a method for driving a capacitive display device, in which a capacitive display layer intervenes between plural scanning side electrodes and plural data side electrodes arranged in mutually intersecting directions, and the data electrodes are provided with a modulation voltage varied in pulse width depending on the display data from one end side of electrodes, with the other side of electrodes being mutually on opposite sides with respect to the extending direction of the data side electrodes, in one line or in every one of plural lines, while the scanning electrodes are provided with writing voltage sequentially, and along with the scanning sequence of the scanning electrodes, the pulse width is gradually decreased or increased with respect to the data pulse applied from one end side of the data electrodes, and the pulse width is gradually increased or decreased as to keep complementary relation with the pulse width changes with respect to the data pulse applied from the one end side, with respect to the data pulses applied from other end side of the data side electrodes, and the degree of such change is selected so that picture elements corresponding to same display data may be identical in brightness.

This invention further presents an apparatus for driving a capacitive display device comprising:

a capacitive display device possessing plural first electrodes to be scanned, second electrodes extending in the arrangement direction of the first electrodes and divided into plural groups, and a capacitive display layer intervening between first electrodes and second electrodes, first electrode driving means for driving and scanning by periodically applying predetermiend potentials sequentially to the first electrodes of the capacitive display device, and plural second electrode driving means corresponding to individual groups of the second electrodes, possessing a pulse width presisting for the driving period corresponding to the gradation predetermined in the second electrodes, and leading out predetermined second potentials of which the potential difference from the first electrodes activates the capacitive display layer, in which the second electrode driving means corresponding to a certain group and the second electrode driving means corresponding to other group contain the second electrode driving means individually arranged in the end parts of the extending direction of the second electrodes.

In a preferred embodiment, the second electrodes are divided into two groups, and each second electrode is connected to two second electrodes driving means in every one of line or in every plural lines.

According to this invention, since the modulation pulse applied to the data side electrodes for gradation display does not change in voltage only when the pulse width varies depending on the display data, the transistor in the driving circuit for delivering the modulation pulse may always remain on in a saturated state, and the heat loss of the transistor may be kept low. Further, since the high withstand voltage transistor in the integrated circuit is composed of N-channel MOS alone, the cost of the integrated circuit may be reduced.

In this invention, since a ramp voltage is applied to the data side electrodes as a modulation voltage, the peak value of the current flowing in the emission layer of the pixels, as the current contributing to the emission, is kept low. Further the current passing time is extended, and thus the pulse width of the modulation voltage may be set in multiple stages. Still further, the current flowing in the emission layer becomes smaller at the brightness of each stage, and the gradation of brightness is stabilized.

Moreover, according to this invention, by the portion of increase or decrease in the pulse width of the modulation voltage applied to the pixels according to the effect of the line resistance of the data side electrodes, the pulse width of the modulation voltage is preliminarily corrected to be wider or narrower and is set, so that all pixels for same display data emit an equal brightness.

By the drive method and drive circuit of the display apparatus of this invention, the gradation display is achieved by turning on the transistor of the drive circuit for always delivering the modulation pulse in a saturated state. Thus, the heat loss of the transistor may be kept low, and the drive circuit may be easily fabricated in an integrated circuit.

Also by the drive method and the drive device of the display apparatus of this invention, since the ramp voltage is applied to the data side electrodes as a modulation voltage, the peak value of the current flowing in the emission layer of pixels as the current contributing to emission can be kept low. Thus, the passing time of this current is extended, and the gradation display in multiple stages is possible, and the gradation of each stage can be displayed stably.

According to the drive method of the display apparatus of this invention, since the pulse width of the modulation voltage is corrected and set preliminarily by the increasing a portion of the pulse width of the modulation voltage applied to pixels due to effects of line resistance of the data side electrodes, all pixels for the same display data may emit at an equal brightness.

Also by the drive method of the display apparatus of the invention, since the pulse width of the modulation voltage is preliminarily corrected smaller or larger and set by the portion of increase or decrease of the pulse width of modulation voltage applied to pixels due to the effect of line resistance of the data side electrodes, all pixels for the same display data may emit at an equal brightness.

BRIEF DESCRIPTION OF THE DRAWINGS

FIGS. 4(1), (2), (3) are timing charts showing its operation;

FIGS. 5 (1), (2), (3) are waveform diagrams showing the voltage applied to pixels, power source current, and current flowing in emission layer of pixels in the conventional drive method, respectively;

FIGS. 7(1), (2), (3) are waveform diagrams showing the voltage applied to pixels positioned on a scanning side electrode near an output port of the same thin film EL display apparatus;

FIGS. 8(1), (2), (3) are waveform diagrams showing a voltage applied to pixels on the scanning electrode remote from the output port of the same thin film EL display apparatus;

FIGS. 15 (1), (2), (3) are waveform diagrams showing the voltage applied to the pixels, power source current, and current flowing in the emission layer of the pixels, respectively;

FIGS. 17(1), (2), (3), (4), (5), (6) are timing charts showing its basic operation;

FIG. 18 is a block diagram showing an outline structure of a correcting circuit for correcting the brightness of this thin film EL display apparatus;

FIGS. 19(1), (2) are timing charts showing the operation of this correcting circuit;

FIGS. 20(1), (2), (3) are waveform diagrams showing the voltage applied to the pixels positioned on the first scanning side electrode of the same thin film EL display apparatus;

FIGS. 21(1), (2), (3) are waveform diagrams showing the voltage applied to the pixels positioned on the m-th scanning side electrode of the thin film EL display apparatus;

DETAILED DESCRIPTION OF THE PREFERRED EMBODIMENTS

Figure 9:
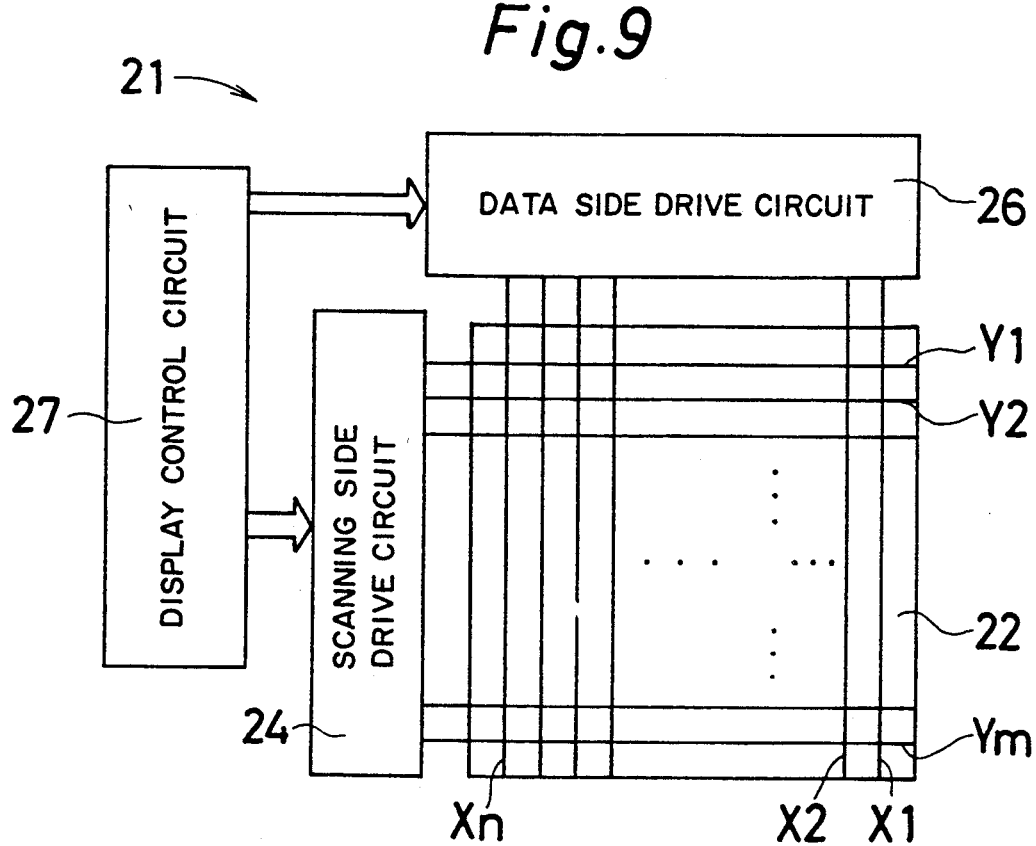
FIG. 9 is a block diagram showing an outline structure of a thin film EL display apparatus to which a drive method as one of the embodiments of this invention is applied.

FIG. 9 is a block diagram showing an outline structure of a thin film EL display device 21 as a capacitive display device to which a drive method as one of the embodiments of the invention is applied. In the drawing, a display panel 22 is made of thin film EL element, and its practical composition is same as explained in the prior art here, thus, the same explanation is omitted here. Scanning side electrodes Y1, Y2, . . . , Yn (collectively indicated by reference code Y) of the display panel 22 are connected to a scanning side drive circuit 24, data side electrodes X1, X2, . . . , Xn (collectively indicated by reference code X) of the display panel 22 are connected to a data side drive circuit 26, and a display control circuit 27 for controlling these circuits is connected to the scanning side drive circuit 24 and data side drive circuit 26.

Figure 10:
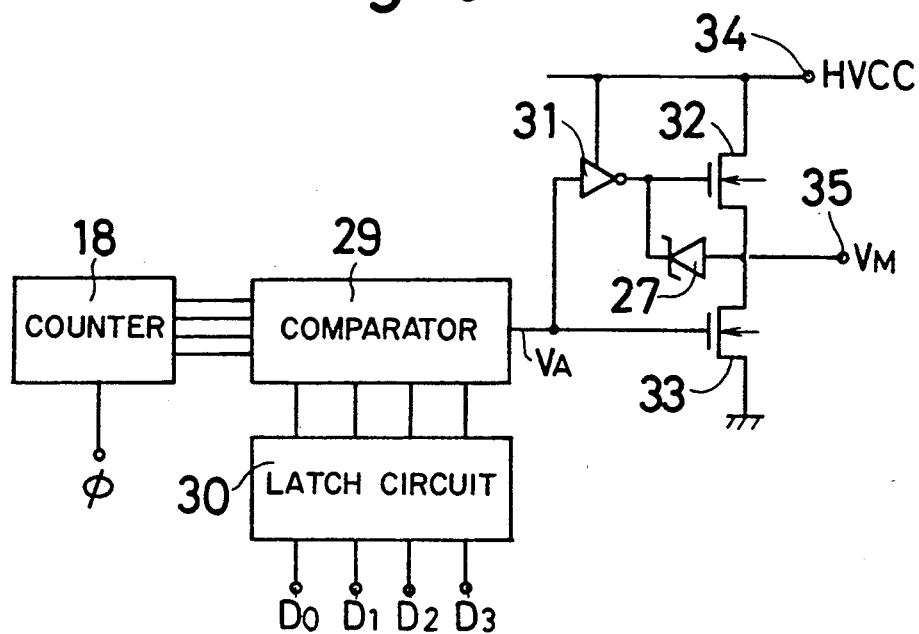
FIG. 10 is a circuit diagram showing one output part of the same data side drive circuit.

FIG. 10 is a circuit diagram showing an outline structure of the output portion corresponding to an arbitrary pixel of the data side drive circuit 26. In FIG. 10, a counter 28 is a circuit for counting clocks $\phi$ for gradation given from the display control circuit 27, and it is connected to a comparator 29. A latch circuit 30 is a circuit for holding the gradation display data given from the display control circuit 27 while illuminating the corresponding pixel. It is also connected to the comparator 29. Here, as the gradation display data per pixel, 4-bit data "$D_0$, $D_1$, $D_2$, $D_3$" is given, and the gradation of 16 stages is obtained.

The comparator 29 possesses a function for delivering a voltage $V_A$ at H level when the counting of the counter 28 coincides with the gradation display data "D0, D1, D2, D3" held by the latch circuit 30. The comparator 29 is connected to the gate of a first N-channel MOS transistor 32 through an inverter 31, and is also connected to the gate of a second N-channel MOS transistor 33. The drain of the first N-channel MOS transistor 32 is connected to a power supply 34 for feeding a potential HVCC of the modulation pulse. Further, the source of this first transistor 32 is connected to the drain of the second N-channel MOS transistor 33, and the source of the second transistor 33 is grounded.

The connecting point of the source of the first N-channel MOS transistor 32 and the drain of the second N-channel MOS transistor 33 is connected to an output terminal 35. Between the source and gate of the first N-channel MOS transistor 32, a zener diode 36 for passing a current in a reverse direction to the transistor 32 is connected.

Figure 1:
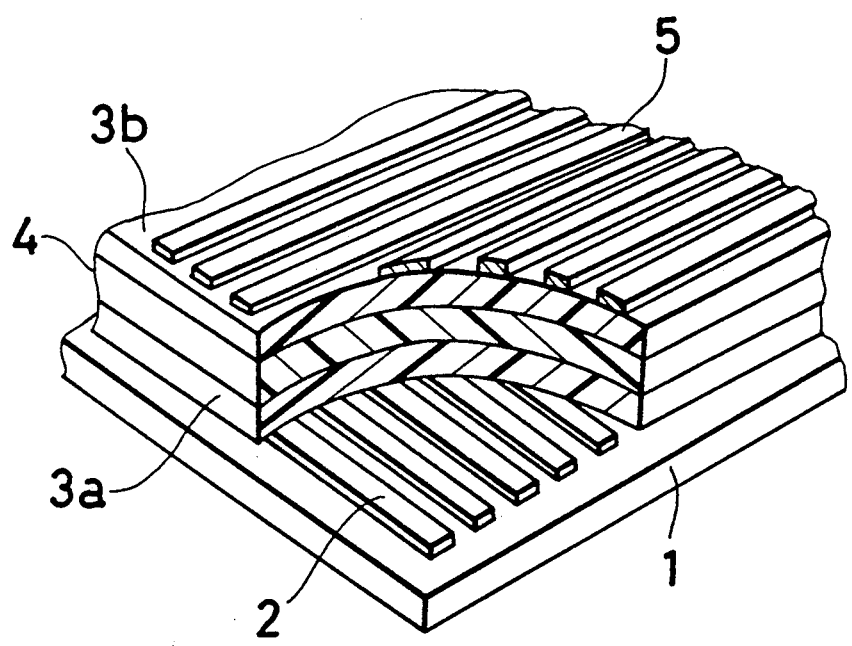
FIG. 1 is a partially cut-away perspective view of a thin film EL element.
Figure 2:
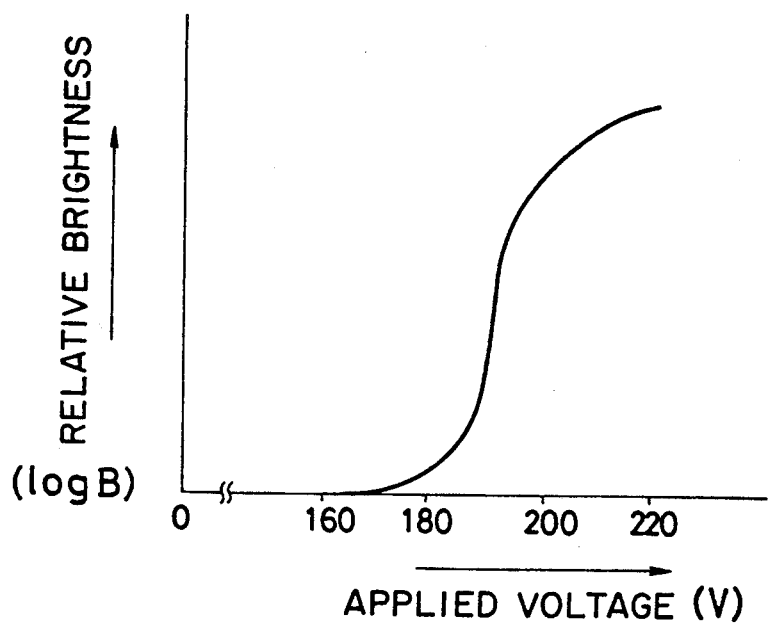
FIG. 2 is a graph showing the voltage-brightness characteristic of a thin film EL element.
Figure 3:
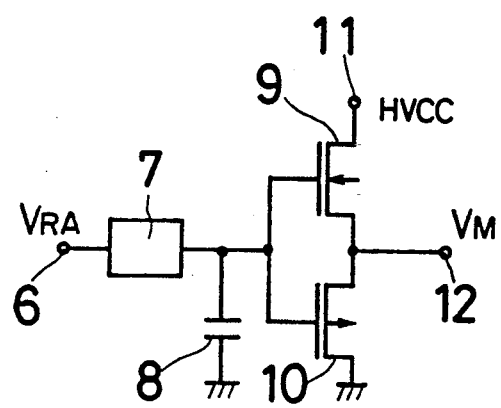
FIG. 3 is a circuit diagram showing one output part of data side drive circuit of thin film EL display apparatus to which a conventional drive method is applied.
Figure 6:
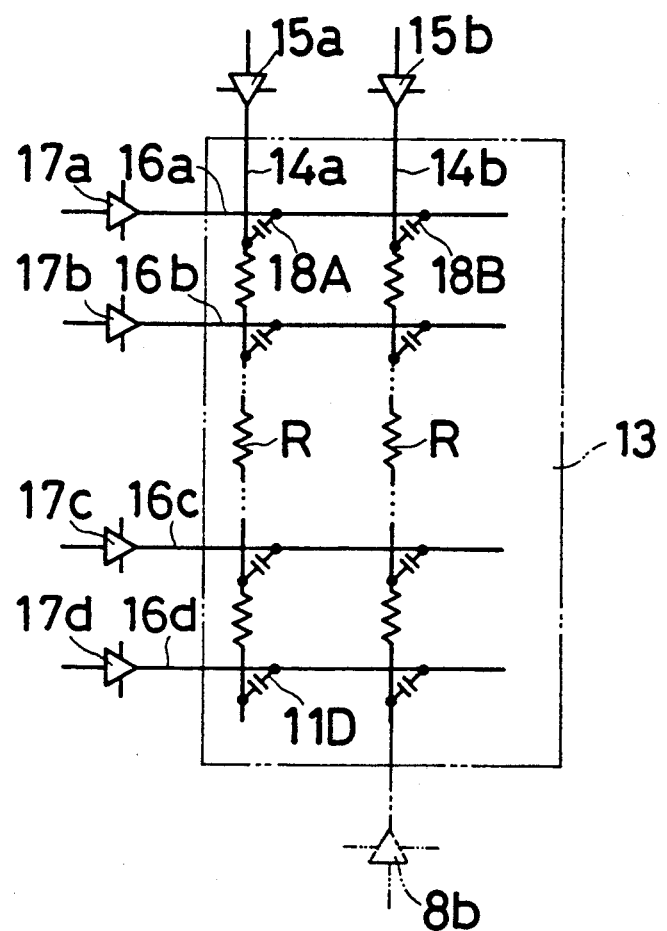
FIG. 6 is a circuit diagram showing an outline structure of essential parts of a thin film EL display apparatus to which a conventional drive method is applied.
Figure 11:
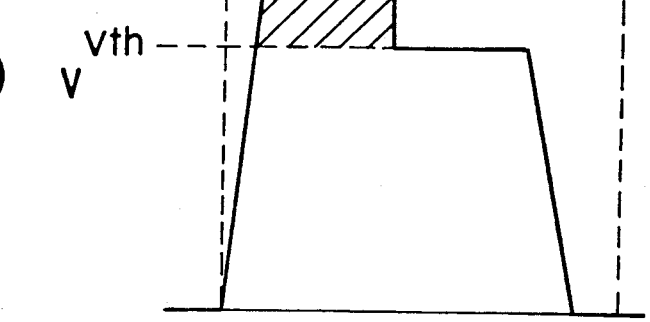
FIGS. 11(1), (2), (3), (4), (5) are a timing charts showing its operation.
Figure 12:
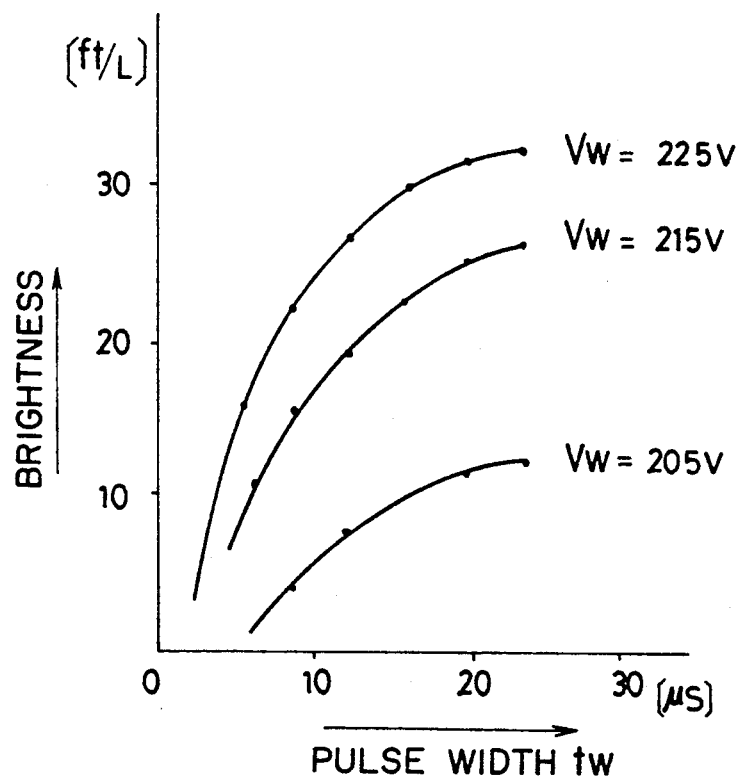
FIG. 12 is a graph showing the relation between pulse width and brightness.

FIG. 11 is a timing chart showing the operation of the gradation display drive by the above thin film EL display apparatus 21. FIG. 12 is a graph showing the relation between the pulse width and brightness of the modulation pulse applied to an EL substance 4 (see FIG. 1). This EL substance 4 possesses a characteristic to increase the brightness when the applied voltage is higher, or when the applied time is longer if the voltage is constant. On the basis of this characteristic, it is possible to control to display the EL substance 4 in gradation by the PWM system.

When a binary code of, for example, "0111" is applied from the display control circuit 27 to the latch circuit 30 as gradation display data "D3, D2, D1, D0," if clocks $\phi$ for gradation are sequentially entered from the display control circuit 27 into the counter 28 as shown in FIG. 11 (1). The counting of the counter 28 first becomes "0000" by the first clock $\phi$ input, and the counting increases at every input of clock $\phi$ thereafter.

When eight clocks $\phi$ for gradation are entered in the counter 28, and its counting reaches the gradation display data "D3, D2, D1, D0" held by the latch circuit 30, the output voltage $V_A$ of the comparator 29 is inverted from L level to H level as shown in FIG. 11 (2). As a result, the gate potential of the first N-channel MOS transistor 32 and the gate potential of the second N-channel MOS transistor 33 are respectively changed from the hitherto H level to L level and L level to H level, the first transistor 32 is inverted from ON to OFF, and the second transistor 33 is inverted from OFF to ON. Therefore, the modulation voltage Vm taken out from the output terminal 35 is inverted from H level to L level when eight clocks $\phi$ for gradation are entered into the counter 28.

Up to this point of inversion, a voltage equal to the voltage HVCC of the power supply 34 is being applied to the gate of the first N-channel MOS transistor 32, and the H level of the voltage of the output terminal 35 when the first transistor 33 is turned on, that is, the modulation voltage Vm, is nearly equal to the voltage HVCC of the power supply 34.

Meanwhile, the time width of the waveform of this modulation voltage Vm possessing a frequency of 1 MHz to 500 kHz, or the pulse width of modulation pulse, varies along with the gradation display data shown above. The pulse width is broadened as the value of the gradation display data increases. This modulation voltage Vm is applied to the data side electrodes 25 containing one pixel corresponding to it.

At this time, the scanning side electrodes Y are provided with a writing voltage Vw equal to the threshold voltage Vth at which the voltage level starts light emission of the EL layer in the reverse polarity to the modualtion voltage Vm. Therefore, the above pixel is provided with an active voltage in the waveform as shown in FIG. 11 (5) on the basis of the scanning side electrode Y. Thus, the pixel emits light only for the period of pulse width of the modulation pulse.

That is, the emission brightness of the pixel varies depending on the gradation display data, and gradation display is effected. Incidentally, application of a writing pulse into the scanning side electrodes Y is effected in linear sequence of the scanning side electrodes. Accordingly, the gradation display data is sequentially changed into the data corresponding to the pixels contained in the corresponding scanning side electrodes Y. Furthermore, in the above driving operation, in the first field, when a writing pulse of negative polarity with respect to, for example, the data side electrodes X is applied to the scanning side electrodes Y, in the second field, a writing pulse of positive polarity with respect to the scanning side electrodes Y is applied to the data side electrodes X. Thus, AC driving for repeating the first field and second field alternately is effected.

In the case of the above driving, the drain and source are nearly at the same potential when the first N-channel MOS transistor 22 is turned on, and the heat loss caused by the flowing current is kept low.

Figure 13:
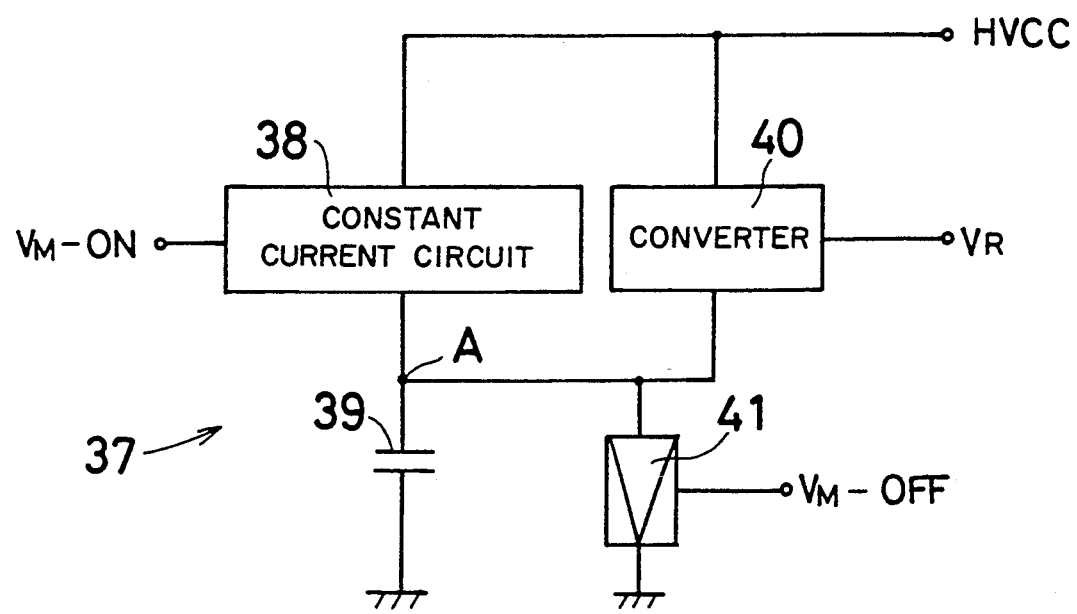
FIG. 13 is a block diagram showing an outline structure of its ramp voltage generating circuit.

FIG. 13 is a block diagram showing an outline structure of a ramp voltage generating circuit 37 for supplying a ramp voltage at modulation voltage $V_M$ to the output stage of the data side drive circuit 26. In FIG. 13, a constant current circuit 38 is a circuit for passing a specific current by receiving a modualtion start signal $V_M$-ON from other functional part of the data side drive circuit 26, and it is connected to the power supply HVCC and also to one of the terminals of the capacitor 39, while the other terminal of the capacitor 39 is grounded.

A converter 40 is a circuit for receiving a charging voltage of a capacitor 39, and delivering a voltage $V_R$ varying according to this charging voltage, and it is connected to the power supply HVCC and also to the connecting point A of the constant current circuit 38 and capacitor 39. Between the connecting point A and the ground, a switch 41 to be turned on by receiving a modulation end signal $V_M$-OFF given from other functional part of the data side drive circuit 26 is connected. The voltage of the power supply HVCC is set at the peak value of the modulation voltage $V_M$.

Figure 14:
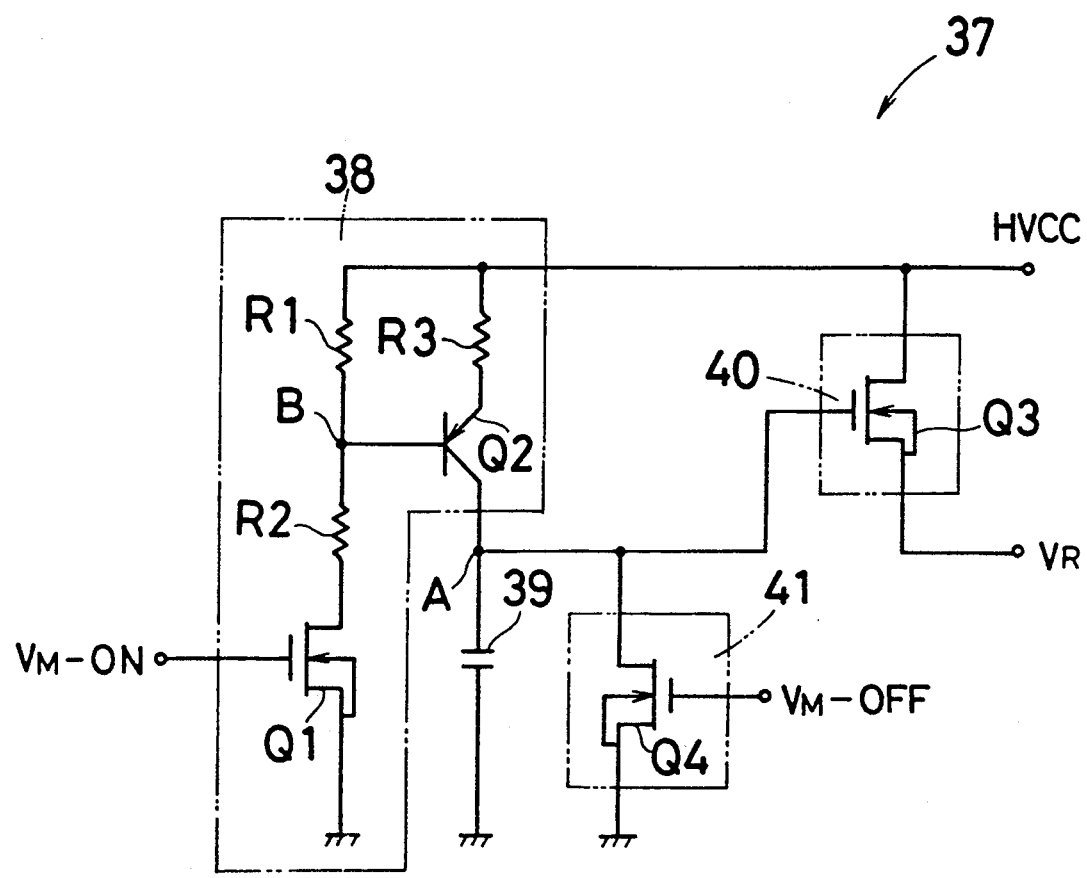
FIG. 14 is a circuit diagram showing a practical composition of this ramp voltage generating circuit.

FIG. 14 is a circuit diagram showing an example of practical composition of a ramp voltage generating circuit 37 shown in FIG. 13. In FIG. 14, the constant current circuit 38 is composed of resistances R1, R2, R3, N-channel MOS transistor Q1, and PNP transistor Q2.

That is, resistances R1, R2 are connected in series, and one end of the resistance R1 is connected to the power supply HVCC, and the other end of the resistance R2 is connected to .he drain of the N-channel MOS transistor Q1. Further the source of this transistor Q1 is grounded, and a voltage of H level is applied to the gate of this transistor Q1 as the modulation start signal $V_M$-ON. At the connecting point B of the resistances R1, R2, the base of the PNP transistor Q2 is connected, the emitter of the transistor Q2 is connected to the power supply HVCC through resistance R3, and the collector of the transistor Q2 is connected to one of the terminals of the capacitor 13.

The converter 40 is composed of N-channel MOS transistor Q3, the gate of the transistor Q3 is connected to the connecting point A of the capacitor 39 transistor Q2, and the drain of the transistor Q3 is connected to the power supply HVCC, and the source of the transistor Q3 is connected to the output stage of the data side drive circuit 26 shown above (FIG. 9).

The transistor Q3 has a sufficient current supply capacity, and its source voltage does not vary depending on the output stage of the data side drive circuit 26. The switch 41 is also composed of N-channel MOS transistor Q4, its drain is connected to the connecting point A, its source is grounded, and a voltage of H level is applied to its gate as modulation termination signal $V_M$-OFF.

FIG. 15 (1), (2), and (3) show the applied voltage waveform to the pixel in the gradation display driving in the thin film EL display apparatus 21 described above, the waveform of the supply current at this time, and the waveform of the current flowing in the emission layer of the pixel, respectively. Referring to these waveform diagrams, the operation is described below.

From time t0, application of writing voltage Vw from the scanning side drive circuit 24 shown in FIG. 9 to the scanning side electrodes Y is started. Further, the writing voltage Vw reaches the emission threshold voltage Vth (time t1), H level voltage is applied to the gate of the transistor Q1 of the ramp voltage generating circuit shown in FIG. 14 as modulation start signal $V_M$-ON. As a result, the transistor Q1 is turned on, and the base potential of the transistor Q2 is lowered, and the transistor Q2 is turned on. Sequentially, a constant current begins to flow from the power supply HVCC into the capacitor 39 through resistance R3 and transistor Q2.

The charging voltage of the capacitor 39 rises at a specific gradient as the time passes. Therefore, in the transistor Q3 which receives this charging voltage as a gate signal, its output or the source voltage $V_R$ increases in proportion to the charging voltage. That is, the output of the transistor Q3 becomes a ramp voltage $V_R$ elevating at a specific gradient with the passing of the time. This ramp voltage $V_R$ is supplied to the output stage of the data side drive circuit 26, and is applied to the data side electrodes X as modulation voltage $V_M$.

After a specific time T (time t3), H level voltage applied to the gate of the transistor Q4 of the ramp voltage generating circuit 37 shown in FIG. 14 as modulation termination signal $V_M$-OFF. Then the electric charge in the capacitor 39 is discharged, the charging voltage in the capacitor 39 is suddenly lowered, and the ramp voltage $V_R$ drops at the same time. In this way, the modulation voltage $V_M$ in the ramp waveform with pulse width T is applied from the data side drive circuit 26 into the data side electrodes X.

At this time, the effective voltage $V_A$ applied to the corresponding pixel becomes a waveform as indicated by solid line in FIG. 15 (1). Therefore, the waveform of the power supply current at this time becomes as shown in FIG. 15 (2), that is, the passing time after the effective voltage $V_A$ has exceeded the emission threshold voltage Vth becomes longer. Meanwhile, the effective voltage $V_A$ is not rectangular wave, but is a superimposed wave of the rectangular writing voltage Vw and modulation voltage $V_M$ of ramp waveform. Therefore the power supply current is not a peak current, but attenuates smoothly.

This tendency directly continues in the current flowing in the emission layer of the pixel, and the waveform of this current is kept low in the peak value as shown in FIG. 15 (3) It then attenuates smoothly to becomes a waveform having a long passing time. Besides, by setting the pulse width of the modulation volta $V_M$ making up the ramp waveform in several short steps as indicated by single dot chain line 1 in FIG. 15 (1), the current passing time flowing in the emission layer of the pixel shown in FIG. 15 (2) can be also shortened. Thus, gradation display is realized.

In this case, since the current passing time flowing in the emission layer of the pixel is longer than in the prior art, the variable setting range of the pulse width of modulation voltage $V_M$. That is, the effective movable range indicated by symbol t in FIG. 15 (1) is widened, and the gradation display of multiple stages can be easily effected.

Moreover, the peak value of the current flowing in the emission layer of the pixels can be kept low, and the current at the brightness of each gradation stage is small. Thus, the brightness does not change significantly due to error in the pulse width of the modulation voltage $V_M$. Therefore, the gradation of each stage can be stably displayed.

In this embodiment, it is explained to drive the thin film EL display apparatus 21, but this invention may be similarly applied to the driving of other capacitive display apparatuses such as a plasma display.

Figure 16:
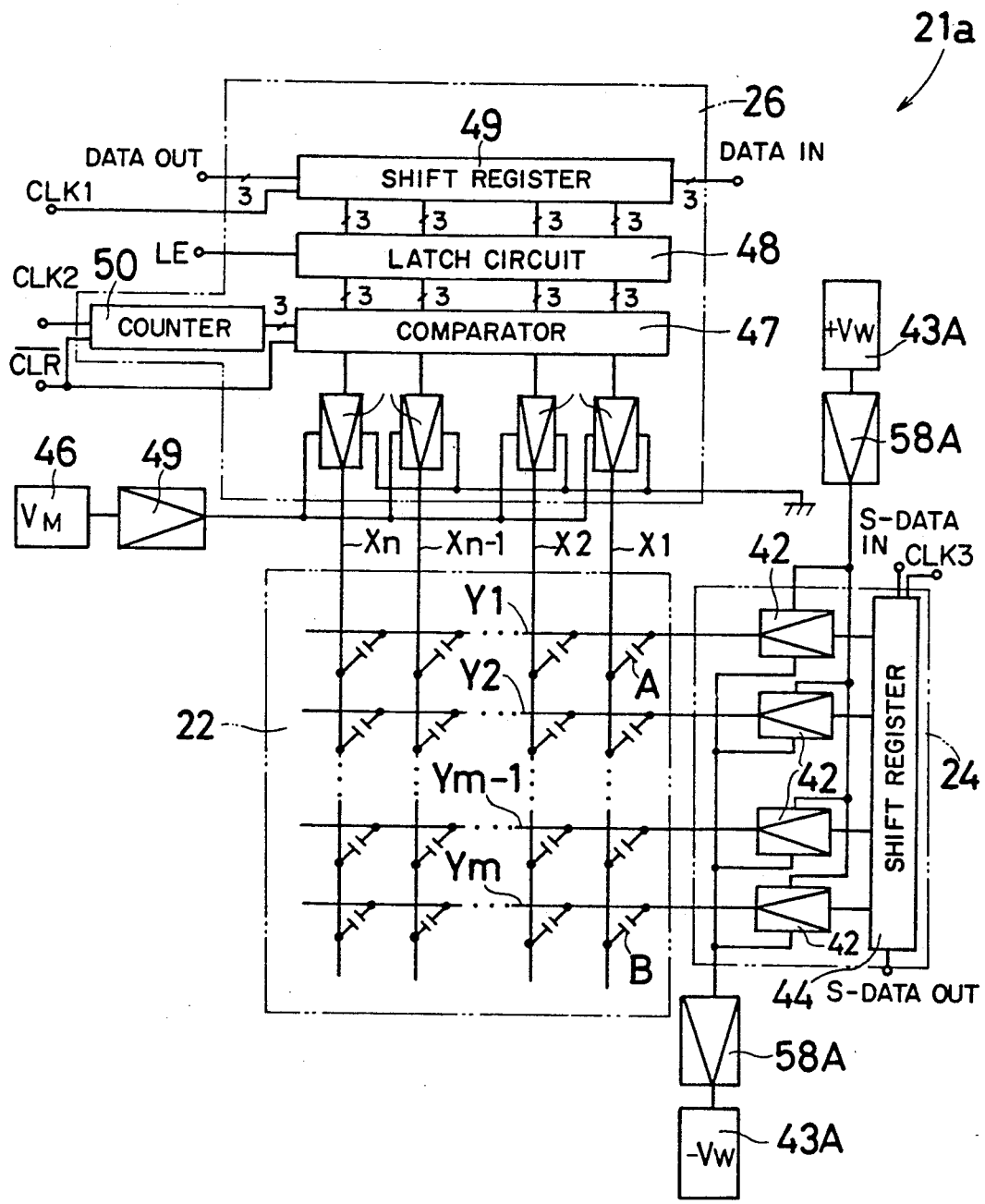
FIG. 16 is a block diagram showing an outline structure of a thin film EL display apparatus to which a drive method of another other embodiment of this invention is applied.

FIG. 16 is a block diagram showing an outline structure of a thin film EL display apparatus 21a to which a drive method of another embodiment of the invention is applied. In the drawing, a display panel 22 is made of thin film EL element, and its practical composition is the same as the structure explained in the prior art. Thus, the same explanation is omitted here. Plural scanning side electrodes Y1, Y2, ..., Ym-1, Ym arranged on the display panel 22 are connected to a scanning side drive circuit 24 disposed at the right side of FIG. 16. In a direction orthogonal to the scanning side electrodes Y1 to Ym, plural data sides electrodes X1, X2, ..., Xn-1, Xn are connected to a data side drive circuit 26 disposed in the upper side of FIG. 16.

In the scanning side drive circuit 24, output circuits 42 are individually connected to the scanning side electrodes Y1 to Ym, through these output circuits 42, writing voltage $-Vw$ or $+Vw$ is selectively applied to the scanning side electrodes Y1 to Ym from a minus power supply 43A to which a switch 58A is connected, or from a plus power supply 43B to which a switch 58B is connected. These output circuits 42 are connected to a shift register 44, and in synchronism with a clock CLK3 entered from the clock input terminal of the shift register 44, scanning data S-DATA for setting the scanning side electrodes Y1 to Ym in linear sequence is transferred to the shift register 44. Thus, the output circuits 42 are turned on in the linear sequence of the scanning side electrodes Y1 to Ym.

On the other hand, in the data side driving circuit 26, output circuits 45 which are switches for push-pull action being composed of C-MOS transistors are individually connected to the data side electrodes X1 to Xn. Through these output circuits 45, the modulation voltage $V_M$ is selectively applied to the data side electrodes X1 to Xn from a power supply 46 having a switch 49. Besides, depending on the setting state of the output circuit 45, the data side electrodes X1 to X2 are clamped to the ground.

These output circuits 45 are connected to a comparator 47. This comparator 47 is connected to shift register 49 by way of a latch circuit 48. The shift register 49 makes a shift action in synchronism with the clock CLK1 entered from the clock input terminal, and it transfers the gradation display data corresponding to the data side electrodes X1 to Xn. Further, the data transferred to the shift register 49 is sent to the comparator 47.

The comparator 47 possesses a function for determining the gradation width corresponding to the gradation display data, by comparing the 3-bit parallel data sent from the counter 50 with the gradation display data given from the latch circuit 48. In FIG. 15, meanwhile, each pixel in the display panel 22 is equivalently expressed by capacitors.

FIG. 18 is a block diagram showing a correcting circuit 51 for correcting the brightness difference among pixels caused by the line resistance of data side electrodes X1 to Xn. In the correcting circuit 51 in FIG. 18, the clock generator 52 is a circuit for generating a fundamental clock CLK for determining the gradation width corresponding to the gradation display data. It can be operated by the enable signal CLKE given from its input terminal.

In the next stage of the clock generator 52, a delay circuit 53 is connected which delays the fundamental clock CLK by a predetermined amount and applies it as clock CLK2 of the counter 50 in the data side drive circuit 26. A scanning line position detection circuit 54 is connected to this delay circuit 53. The scanning line position detection circuit 54 possesses the functions for counting up and counting down the horizontal sync signals HD entered from the input terminal 55 as clocks, and it is reset by a vertical sync signal VD entered from the input terminal 56.

The count-up signal or count-down signal of the scanning line position detection circuit 54 is sent into the delay circuit 53, and delay is processed in the delay circuit 53 according to the quantity corresponding to this signal. At the input terminal 57 of the scanning line position detection circuit 54, a signal EDD for determining which one of the above count-up signal or count-down signal should be sent into the delay circuit 53 is entered. In this embodiment, the signal EDD is set at L level, and a count-down signal is sent to the delay circuit 53. When the signal EDD is set at H level, a count-up signal is sent into the delay circuit 53.

The basic operation of the thin film EL display apparatus 21a in FIG. 16 is explained below while referring to the timing chart shown in FIG. 17.

To the shift register 49 of the data side drive circuit 26, gradation display data is transferred in a form of 3-bit binary code in synchronism with the clock CLK1. This 3-bit gradation display data is temporarily held in the latch circuit 48. In this state, the clear signal CLR hitherto entered in the comparator 47 and counter 50 is canceled as shown in FIG. 17 (1) (time t1). The data side electrode X corresponding to the data of "0" out of the gradation display data held in the latch circuit 48 is clamped to the ground level, and all other data side electrodes X corresponding to other data are pulled up to the modulation voltage $V_M$.

Suppose, for example, gradation display data 0, 2, 4, and 7 are given to the output ports 45 corresponding to the data side electrodes X1, X2, Xn-1, Xn of the data side drive circuit 26. At this time, the output circuit 45 of the data side electrode X1 is clamped to the ground simultaneously with cancellation of clear signal $\overline{CLR}$, thereby becoming the waveform shown in FIG. 17 (3). That is, the gradation width is set at zero.

At the output circuit 45 of the data side electrode X2, on the other hand, the counting of the clocks CLK2 [see FIG. 17 (2)] counted by the counter 50 is compared with the gradation display data "2" in the comparator 47. This counting value is clamped to the ground level at the timing of becoming "2" (time t2), and the gradation width Tw of the waveform shown in FIG. 17 (4) is set. Likewise, the output circuit 45 of the data side electrode Xn−1 is clamped to the ground level at the timing when the counting of the counter 50 becomes 4 (time t3), and the gradation width T4 of the waveform shown in FIG. 17 (5) is set. As for the output circuit 45 of the data side electrode Xn, similarly, it is clamped to the ground level at the timing (time t4) when the counting of the counter 50 becomes 7. Thus, the gradation width T7 of the waveform shown in FIG. 17 (6) is set. Therefore, at the data side electrodes X1, X2, Xn−1, Xn, modulation voltages $V_M$ in the pulse width corresponding to the gradation display data 0, 2, 4, 7 are applied.

On the other hand, in the scanning side drive circuit 24, while the clear signal CLR is being cancelled by the data side drive circuit 26, one of all output circuits 42 is turned on, and the writing voltage $-V_W$ is applied only to one corresponding scanning side electrode Y. In the next field, the writing voltage $+V_W$ is applied in the same way.

When the above operation is repeated in the linear sequence of the scanning side electrodes Y, the pixels positioned on each scanning electrodes Y emit light or do not, depending on the gradation display data. Thus, screen having gradation in brightness is displayed on the whole.

Next the operation of brightness correction by the correcting circuit 51 shown in FIG. 18, is explained by referring to the timing chart shown in FIG. 19.

A clock generator 52 delivers a fundamental clock CLK in the waveform shown in FIG. 19 (1) as the basis for determining the gradation width. In the scanning line position detection circuit 54, after being reset by receiving a vertical sync signal VD, the horizontal sync signals HD are counted down as clock signals. In this count-down action, the number "m" of the horizontal sync signal HD in one field is set as the initial value. When the first horizontal sync signal HD in the field is counted, the count-down signal "m−1" is sent into the delay circuit 53. At the delay circuit 53, by the portion corresponding to this count-down signal "m−1" delay processing is conducted on the fundamental clock CLK as shown in FIG. 19 (2), and this clock is given to as clock CLK2 of the counter 50 of the data side drive circuit 26.

In this case, since the count-down signal "m−1" is large, the delay amount Ta corresponding to the fundamental clock CLK of the clock CLK2 is large. Therefore, in the data side drive circuit 26, the timing for starting counting of the clock CLK2 in the counter 50 is significantly delayed. Thus, a modulation voltage $V_M$ of pulse width tA+Ta larger than the pulse width tA corresponding to the gradation data by the portion of delay amount Ta is applied.

FIG. 20 shows the waveform of applied voltage to the pixel A at the intersecting position between the first scanning side electrode Y1 and the data side electrode X1. Specifically, FIG. 20 (1) shows the waveform of modulation voltage $V_M$ applied from the data side electrode X1, and FIG. 20 (2) shows the waveform of the writing voltage $-V_W$ corresponding to the emission threshold voltage Vth given from the first scanning side electrode Y1. The effective voltage applied to the pixel A at this time has the waveform as shown in FIG. 20 (3).

That is, at this pixel A, since a modulation voltage $V_M$ with a pulse width of tA+Ta wider than the delay portion Ta of the clock CLK2 than the pulse width tA corresponding to the gradation display data as explained above is applied, the area is increased by the portion indicated by the shaded area in FIG. 20 (3) of the portion higher than the emission threshold voltage Vth contributing to the emission at the effective voltage. Thus, it is corrected to a higher brightness by the portion of this area increase.

In the correcting circuit 51 in FIG. 18, when the count-down of the scanning line position detection circuit 54 is advanced, when the count-down signal becomes m-m or zero, the delay amount in the delay circuit 53 becomes zero, and the delay amount with respect to the fundamental clock CLK of the clock CLK2 also becomes zero. Therefore, at the data side drive circuit 26, the starting timing for counting the clock CLK2 in the counter 50 is not delayed, and the modulation voltage $V_M$ in the pulse width tA corresponding to the gradation display data is applied. In this case, since the count-down signal of the scanning line position detection circuit 54 is m-m, writing voltage $-V_W$ is applied to the scanning side electrode Ym.

FIG. 21 shows the waveform of the applied voltage to the pixel B at the intersecting position with the data side electrode X1, similar to the case of the m-th scanning side electrode Ym shown above. Specifically, FIG. 21 (1) shows the integration distribution when the modulation voltage $V_M$ applied from the data side electrode X1 is influenced by the line resistance of the transparent electrode FIG. 21 (2) denotes the waveform of writing voltage $-V_W$ corresponding to the emission threshold voltage Vth given from the m-th scanning side electrode Ym. Therefore, at this time, the effective voltage applied to the pixel B becomes the waveform as shown in FIG. 21 (3).

In this case, since the pixel B is remote from the output circuit 45, it is influenced heavily by the line resistance. Thus applied modulation voltage $V_M$ becomes an integration waveform as shown in FIG. 21 (1), and of the portion over the emission threshold voltage Vth contributing to emission at the effective voltage, the shaded area in FIG. 21 (3) is increased.

However, if the same gradation display data as the pixel A positioned on the first scanning side electrode Y1 is set in the pixel B, the area increment indicated by shaded area in FIG. 20 (3) caused at the effective voltage in the case of pixel A when a modulation voltage $V_M$ with a pulse width of tA+Ta greater than the pulse width tA corresponding to the gradation display data mentioned above, becomes nearly equal to the area increment due to the effect of the line resistance in the shaded area in FIG. 21 (3) at the effective voltage applied to the pixel B. In other words, between the pixels, A, B positioned on the same data side electrode X1, the brightness is identical for the same gradation display data.

The amount of correction of brightness is determined depending on the value of the count-down signal of the scanning line position detection circuit 54. Further since the value of the count-down signal indicates the position of the scanning side electrode Y at which the writing voltage $-V_W$ is applied at that time. At last, therefore, by the portion of increase of line resistance, the amount of brightness correction decreases in the linear sequence of the scanning side electrodes Y. Thus, the sum of the increment of brightness due to effects of line resistance and the increment of brightness due to brightness correction is always the same.

In this way, a same brightness is always obtained for the same gradation display data, between pixels over the entire screen.

In this embodiment, as shown in FIGS. 20 and 21, since the application timing of the modulation voltage $V_M$ is set so that the rising part of the modulation voltage $V_M$ may be dislocated from the portion corresponding to emission of the effective voltage applied to pixels, if the modulation voltage $V_M$ is influenced by the line resistance to become an integration waveform, the rising part does not matter particularly. On the other hand, when setting the application timing of the modulation voltage $V_M$ so that the descending portion of the modulation voltage $V_M$ may be dislocated from the portion contributing to emission of the effective voltage, the descending portion of the integration waveform does not matter. However, the rising portion matters. This rising portion of the integration waveform acts to reduce the area of the effective voltage applied to the pixels as the effects of the line resistance becomes larger, reverse to the case of the foregoing embodiment, and in this case the brightness correction should be reverse to the embodiment. In other words, the signal EDD applied to the input terminal of the scanning line position detection circuit 54 shown in FIG. 18 should be set to H level, contrary to the case of the embodiment.

Figure 22:
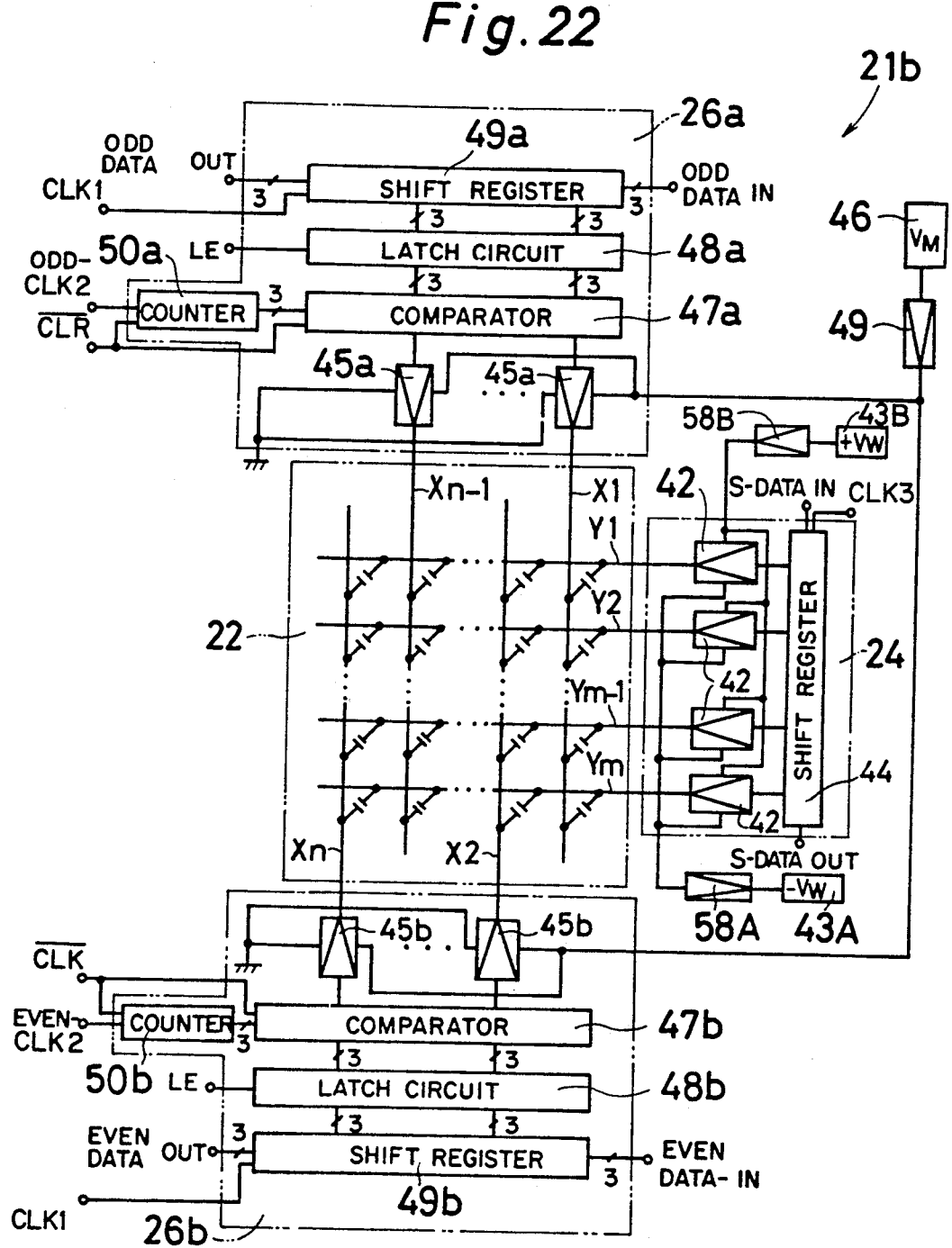
FIG. 22 is a block diagram showing an outline structure of a thin film EL display apparatus to which a drive method of an embodiment of the invention is applied.

FIG. 22 is a block diagram showing an outline composition of thin film EL display apparatus 21b to which a drive method of a further different embodiment of the invention is applied. In the drawing, a display panel 22 is composed of thin film EL element, and its practical composition is same as previously explained regarding the prior art. Thus the same explanation is omitted here.

Plural scanning side electrodes Y1, Y2, . . , Ym−1, Ym arranged on the display panel 22 are connected to a scanning side drive circuit 24 disposed at the right side in FIG. 22. Of the plural data side electrodes X1, X2, . . . , Xn−1, Xn arranged toward the orthogonal direction to the scanning side electrodes Y1 to Ym, odd-numbered data side electrodes X1, . . . , Xn−1 (hereinafter arbitrary data side electrodes are indicated by symbol X) are connected to a first data side drive circuit 26a provided at the upper side in FIG. 22, and even-numbered data side electrodes X2, . . . , Xn are connected to a second data side drive circuit 26b disposed at the lower side in FIG. 22.

In the scanning side driving circuit 24, output circuits 42 are individually connected to the scanning side electrodes Y1 to Ym, and writing voltage −Vw or voltage +Vw corresponding to the emission threshold voltage Vth is selectively applied to the scanning side electrodes Y1 to Ym from a negative power supply 43A or a positive power supply 43B through these output circuits 42. These output circuits 42 are connected to a shift register 44, and the scanning data S-DATA for setting the scanning side electrodes Y1 to Ym in linear sequence are transferred to the shift register 44 in synchronism with the clock CLK3 entered from the clock input terminal of the shift register 44. Further, the output circuits 42 are turned on in the linear sequence of the scanning side electrodes Y1 to Ym.

In the first data side drive circuit 26a, output circuits 45a are individually connected to odd-numbered data side electrodes X1, . . . , Xn−1, and a modulation voltage $V_M$ is selectively applied to the data side electrodes X1, . . . , Xn−1 from the power supply 46 through these output circuit 45a. Besides, depending on the setting state of the output circuits 45a, the data side electrodes X1, . . . , Xn−1 are clamped at the ground level.

These output circuits 45a are connected to a comparator 47a. The comparator 47a is connected to a shift register 49a through a latch circuit 48a. The shift register 49a is a circuit for transferring the gradation display data corresponding to the data side electrodes X1, . . . , Xn−1 by shifting in synchronism with the clock CLK1 entered from the clock input terminal. Further gradation display data transferred to the shift register 49a is temporarily held in a latch circuit 48a, and is sent into the comparator 47a. The comparator 47a compares the 3-bit parallel data given from the counter 50a and the gradation display data given from the latch circuit 48a, and determines the gradation width corresponding to the gradation display data.

The composition of the second data side drive circuit 26b is same as that of the first data side drive circuit 26a, and output circuits 45b are individually connected to the even-numbered data side electrodes X2, . . . , Xn. Through these output circuits 45b, modulation voltage $V_M$ is selectively applied to the data side electrodes X2, . . . , Xn from the power supply 46.

These output circuits 45b are connected to a comparator 47b, and the comparator 47b is connected to a shift register 49b through a latch circuit 48b. The comparator 47b compares the 3-bit parallel data given from the counter 50b with the gradation display data given from the latch circuit 48b, and determines the gradation width corresponding to the gradation display data. In FIG. 22, meanwhile, the pixels in the display panel 22 are equivalently expressed by capacitors.

Figure 23:
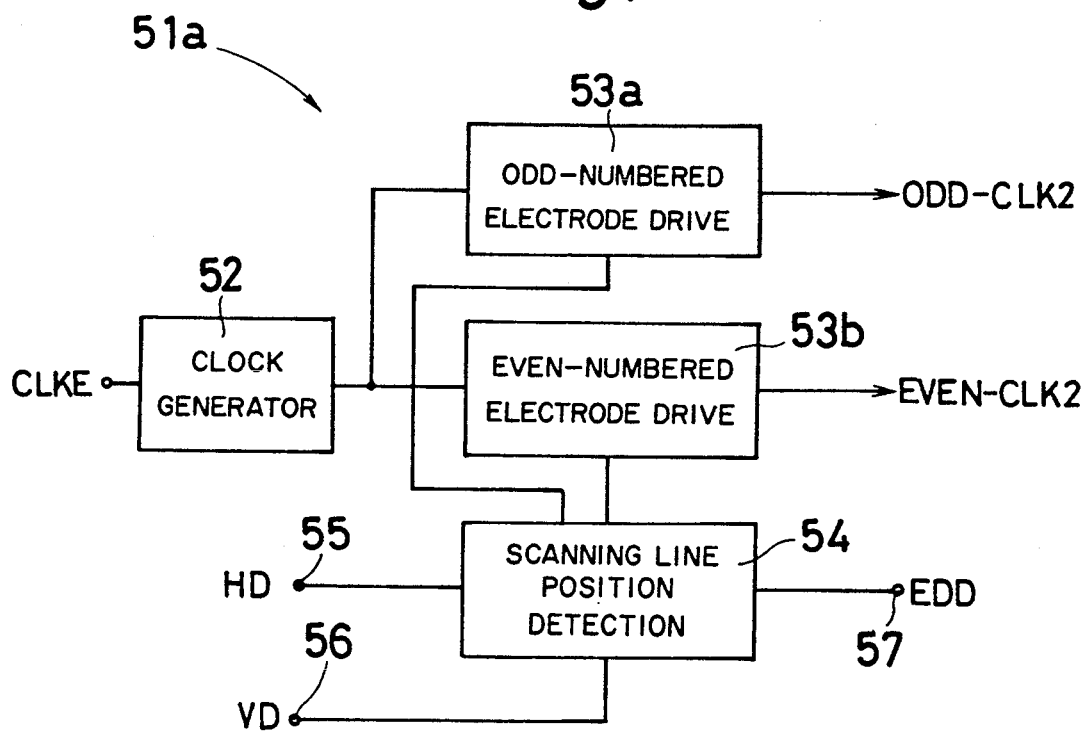
FIG. 23 is a block diagram showing an outline structure of a correcting circuit for correcting the brightness of the same thin film EL display apparatus.

FIG. 23 is a block diagram showing a correcting circuit 51a for correcting the brightness difference among pixels caused due to the line resistance of the data side electrodes X1 to Xn in the above thin film EL display apparatus 21b. In the correcting circuit 51a in FIG. 23, a clock generator 52 is a circuit for generating a fundamental clock CLK for determining the gradation width corresponding to the gradation display data. It is operated by an enable signal CLKE given from its input terminal.

At the next stage of the clock generator 52, a first delay circuit 53a for delaying the fundamental clock CLK by a predetermined amount and producing, as a clock, ODD-CLK2 of the counter 50a of the first data side drive circuit 26a, and a second delay circuit 53b for delaying the fundamental clock CLK by a predetermined amount and giving as a clock EVEN-CLK2 of the counter 50b of the second data side drive circuit 26b are connect d. A scanning line position detection circuit 54 is connected to these delay circuits 53a, 53b.

This scanning line position detection circuit 54 has the function of counting up or down the horizontal sync signals HD entering from its input terminal 55 as a clock, and it is reset by a vertical sync signal entering from the input terminal 56. Either the count-up signal or the count-down signal of the scanning line position detection circuit 54 is given to the first delay circuit 53a, the other is given to the second delay circuit 53b, and delaying process is effected in the delay circuit 53a, 53b by the portion corresponding to these signals. A signal EDD for determining to send the count-up signal and count-down signal to either one of the two delay circuits 53a, 53b is fed into the input terminal 57 of the scanning line position detection circuit 54.

In this embodiment, the signal EDD is set at L level, and a count-down signal is given to the first delay circuit 53a, and a count-up signal is given to the second delay circuit 53b. When the signal EDD is set at H level, a count-up signal is given to the first delay circuit 53a, and a count-down signal is given to the second delay circuit 53b.

The basic operation of the thin film EL display apparatus 21b shown in FIG. 22 is explained below while referring to the timing chart shown in FIG. 17.

To the shift registers 49a, 49b of the first and second data side drive circuits 26a, 26b, gradation display data is transferred in a form of 3-bit binary code in synchronism with the clock CLK1. This 3-bit gradation display data is temporarily held in the latch circuits 48a, 48b. In this state, the clear signal $\overline{CLR}$ entered hitherto in the comparators 47a, 47b and counters 50a, 50b is cleared as shown in FIG. 17 (1). Then, the data side electrode X corresponding to "0" data among the gradation display data held in the latch circuits 48a, 48b is clamped at the ground level, and all other data side electrodes X corresponding to the other data are pulled up to the modulation voltage $V_M$.

Suppose the gradation display data 0, 2, 4, and 7 are given to the output circuits 45a, 45b corresponding to the data side electrodes X1, X2, Xn−1, Xn of the data side drive circuit 26a, 26b. At this time, the output circuit 45a of the data side electrode X1 is clamped at the ground level simultaneously with clearing (time t0) of the clear signal $\overline{CLR}$ to become a waveform as shown in FIG. 17 (3). That is, the gradation width is set to zero.

At the output circuit 45b of the data side electrode, the counting value of the clock CLK2 counted by the counter 50b as shown in FIG. 17 (2) is compared with the gradation display data "2" in the comparator 47b. When the counting becomes 2 (time t1), it is clamped at the ground level, and the gradation width T2 in the waveform shown in FIG. 17 (4) is set. Likewise, the output circuit 45a of the data side electrode Xn−1 is clamped at the ground level when the counting of the counter 50a becomes 4 (time t2), and the gradation width T4 in the waveform shown in FIG. 17 (5) is set. The output circuit 45b of the data side electrode Xn is clamped at the ground level when the counting of the counter 50b becomes 7 (time 3), and the gradation width T7 in the waveform shown in FIG. 17 (6) is set. Therefore, in the data side electrodes X1, X2, Xn−1, Xn, modulation voltages $V_M$ in the pulse width corresponding to the gradation display data 0, 2, 4, and 7 are applied.

On the other hand, in the scanning side drive circuit 24, while the clear signal $\overline{CLR}$ is being canceled in the data side drive circuits 26a, 26b, only one of the output circuits 42 is turned on. Thus, a writing voltage −Vw corresponding to the emission threshold voltage Vth is applied only one corresponding scanning side electrode Y.

When this operation is repeated in the linear sequence of the scanning side electrodes Y, the pixels on the scanning side electrodes Y are illuminated or not in the brightness corresponding to the gradation display. Thus, a screen having gradation in brightness on the whole is displayed.

The operation of the brightness correction by the correcting circuit 51a shown in FIG. 23 is described below by referring to the timing chart shown in FIG. 24.

Figure 24:
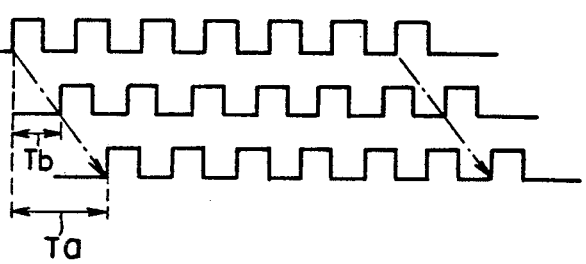
FIGS. 24(1), (2) (3) are timing charts showing the operation of this correcting circuit.

The clock generator 52 delivers a fundamental clock CLK which becomes the basis for determining the gradation width [see FIG. 24 (1)]. In the scanning line position detection circuit 54, after being reset by receiving a vertical sync signal VD, the horizontal sync signals HD as clock are counted up and counted down at the same time. In the count-up operation, "0" is set as the initial value. In the count-down operation, the number "m" of the horizontal sync signals HD in one filed is set as the initial value.

When the first horizontal sync signal VD is counted, this count-down signal "m−1" is sent into the first delay circuit 53a, and the count-up signal "1" is sent into the second delay circuit 53b. By the amount corresponding to the count-down signal "m−1" and the count-up signal "1" the delay circuits 53a, 53b delay the fundamental clocks CLK. These clocks are given as clock ODD-CLK2 of the counter 50a of the first data side drive circuit 26a and clock EVEN-CLK2 of the counter 50b of the second data side drive circuit 26b.

In this case, since the count-down signal "m−1" is sufficiently larger than the count-up signal "1", the delay amount Ta of the clock ODD-CLK2 with respect to the fundamental clock CLK is sufficiently large as shown in FIG. 24 (3), while the delay amount Tb of the clock EVEN-CLK2 is a small value as shown in FIG. 24 (2). Therefore, in the first data side drive circuit 26a, the timing to start counting of the clock ODD-CLK2 in the counter 50a is considerably delayed, and a wider gradation than the gradation width corresponding to the gradation display data is set in the output circuit 45a. Further, modulation voltage $V_M$ of a wider pulse width tA-Ta than the pulse width tA corresponding to the gradation display data is applied to the odd-numbered data side electrodes X1, . . . , Xn-1.

By contrast, in the second data side drive circuit 26b, the timing to start counting of the clock EVEN-CLK2 in the counter 50b is hardly delayed, the gradation width nearly corresponding to the gradation display data is set in the output circuit 45b, and a modulation voltage $V_M$ in a pulse width tA nearly corresponding to the gradation display data is applied to the even-numbered data side electrodes X2, . . . , Xn.

FIG. 20 shows the waveform of applied voltage corresponding to pixels at intersecting positions of the first scanning side electrode Y1 and odd-numbered data side electrodes X1, . . . , Xn−1. Of them, FIG. 20 (1) indicates the waveform of modulation voltage $V_M$ applied from the data side electrodes X1, . . . , Xn−1, and FIG. 20 (2) shows the waveform of the writing voltage −Vw corresponding to the emission threshold voltage Vth applied from the first scanning side electrode Y1.

The effective voltage a plied to the above pixels at this time becomes as shown in FIG. 20 (3). That is, on these pixels, modulation voltage $V_M$ in a pulse width tA+Ta wider than the pulse width tA corresponding to the gradation display data by the portion of delay amount Ta of the clock ODD-CLK2 is applied as mentioned above. Of the portion above the emission threshold voltage Vth contributing to emission at the effective voltage, the portion indicated by shaded area in FIG. 20 (3) is increased in the area, and the brightness is corrected to the higher side by the portion of this area increment.

On the other hand, FIG. 21 shows the waveform of applied voltage to pixels at the intersecting positions of the first scanning side electrode Y1 and the even-numbered data side electrodes X2, ..., Xn. Of them, FIG. 21 (1) indicates the waveform of the modulation voltage $V_M$ applied from the data side electrodes X2, ..., Xn, and FIG. 21 (2) denotes the waveform of writing voltage $-V_w$ corresponding to the emission threshold voltage Vth applied from the first scanning side electrode Y1. Therefore, the effective voltage applied to the pixels at this time has the waveform as shown in FIG. 21 (3).

In this case, since the pixels are remote from the output circuit 45b, the effect of the line resistance is significant, and the modulation voltage $V_M$ being applied becomes the integration waveform as shown in FIG. 21 (1). Further, of the portion above the emission threshold voltage Vth contributing to emission at the effective voltage, the portion indicated by shaded area in FIG. 21 (3) is increased.

Since the modulation voltage $V_M$ in the pulse width tA nearly corresponding to the gradation display data is applied to these pixels, if the same gradation display data are set in the odd-numbered data side electrodes X1, ..., Xn−1 and even-numbered data side electrodes X2, ..., Xn, the area increment indicated by shaded area in FIG. 20 (3) caused at the effective voltage applied to the pixels corresponding to the odd-numbered data side electrodes X1, ..., Xn−1 becomes nearly equal to the area increment due to the effect of line resistance indicated by shaded area in FIG. 21 (3) at the effective voltage applied to the pixels corresponding to the even-numbered data side electrodes X2, ..., Xn. Therefore, among the pixels positioned on the first scanning side electrode Y1, the brightness is the same for same gradation display data.

In the correcting circuit 51a in FIG. 23, when the count-up or count-down of the scanning line position detection circuit 54 is advanced (therefore, the scanning side electrode Y to which the writing voltage $-Vw$ is applied is shifted downward at the same time), the delay amount Ta of the clock ODD-CLK2 delivered from the first delay- circuit 53a is gradually decreased in response, while the delay amount Tb of the clock EVEN-CLK2 delivered from the second delay circuit 53b is gradually increased. Further, when the writing voltage $-Vw$ is applied to the middle scanning side electrode Y, the delay amounts Ta, Tb of the two clocks ODD-CLK2, EVEN-CLK2 become equal to each other.

At this time, at the pixel positioned on the middle scanning side electrode Y, the line length of the odd-numbered data side electrodes X1, ..., Xn−1 and the line length of the even-numbered data side electrodes X2, ..., Xn become equal to each other, and the effects of the line resistance are nearly identical. Accordingly, the brightness corrections of equivalent extents are effected, so that the brightness of pixels may be uniform.

When the count-up and count-down of the scanning line position detection circuit 54 in the correcting circuit 51a in FIG. 23 are further advanced (therefore, the scanning side electrode to which the writing voltage $-Vw$ is applied is shifted downward from the middle), the relation between the delay amount Ta of the clock ODD-CLK2 delivered from the first delay circuit 53a and the delay amount Tb of the clock EVEN-CLK2 delivered from the second delay circuit 53b is inverted. Similarly, the brightness correction corresponding to each delay amount is effected on the corresponding pixels. In other words, the delay amounts Ta, Tb of two clocks ODD-CLK2, EVEN-CLK2 always keep a complementary relation within one field.

In this way, among the pixels in the entire screen, a same brightness is obtained for the same gradation display data.

In this embodiment, meanwhile, as shown in FIGS. 20 and 21, since the application timing of the modulation voltage $V_M$ is set so that the rising part of the modulation voltage $V_M$ may be dislocated from the portion contributing to the emission out of the effective voltage applied to the pixels, if the modulation voltage $V_M$ is influenced by the line resistance to become integration waveform, its rising part does not pose any problem.

By contrast, when the application timing of the modulation voltage $V_M$ is set so that the descending part of the modulation voltage $V_M$ may be dislocated from the portion contributing to the emission of the effective voltage, the descending part of the integration waveform does not matter, but the rising part poses a problem. The rising part of the integration waveform acts to decrease the area of the voltage applied to the pixels as the effect of the line resistance increases, reverse to the case of the above embodiment. Further, in this case the brightness should be corrected in the reverse manner of the shown embodiment. That is, the signal EDD applied to the input terminal of the scanning line position detection circuit 54 shown in FIG. 23 should be set to H level, contrary to the above embodiment.

Incidentally, this invention is not limited to the thin film EL display apparatus 21, 21a, 21b, but it may be freely embodied in any arbitrary capacitive display apparatus such as a plasma display apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for driving a capacitive display device, which includes a capacitive display layer sandwiched between a plurality of scanning electrodes and a plurality of data electrodes arranged in mutually intersecting perpendicular directions, said method comprising the steps of:

applying data pulses, pulse width modulated corresponding to gradation display data, to the data electrodes via a data electrode driver, the data pulses gradually increasing in voltage level during the pulse width modulated period;

applying substantially rectangular writing pulses to the scanning electrodes, sequentiall/, a voltage value of pulse signals of each of the writing pulses being selected to be a value above a predetermined minimum limit capable of emitting light for the display device;

detecting positional location of each of the scanning electrodes, sequentially, relative to the data electrode driver; and delaying each pulse width modulated data pulse by an amount based upon the detected positional location of each corresponding scanning electrode, sequentially, so as to vary each modulated pulse width by a delay amount based upon each sequential activation of the plurality of scanning electrodes.

2. A method for driving a capacitive display device, which includes a capacitive display layer intervening between a plurality of scanning electrodes and a plurality of data electrodes arranged in mutually intersecting perpendicular directions, the method comprising the steps of:

applying data pulses to the data electrodes; and applying writing pulses to the scanning electrodes in sequence of the scanning electrodes, wherein the data pulses applied to the data electrodes having ramp waveforms gradually increasing in voltage level during a rising period of the data pulse, and a pulse width of the data pulses is generally varied dependent upon sequential activation of each corresponding scanning electrode in the sequence of the scanning electrode.

3. An apparatus for driving a capacitive display device comprising:

a capacitive display layer disposed between a layer containing a plurality of data electrodes and a layer containing a plurality of scanning electrodes;

a DC power supply;

impedance converting means possessing an impedance corresponding to a control signal voltage level, connected in series between the DC power supply and the plurality of data electrodes, for varying the impedance between the DC power supply and the plurality of data electrodes;

control signal generating means for generating control signals including a modulation voltage and corresponding current, the modulation voltage and corresponding current both sequentially varying in magnitude along a time duration within a predetermined period, dependent upon a desired gradation, and for applying the control signals to the impedance converting means to vary the impedance in accordance with the control signals; and switching means for passing the current from the impedance converting means to the capacitive display layer through the plurality of data electrodes, only for a time corresponding to the desired gradation in each predetermined period, and for switching off the current for the remaining time in each predetermined period.

4. An apparatus for driving capacitive display device according to claim 3, wherein at least one of the impedance converting means and the switching means are composed of transistors having an N-channel metal oxide semiconductor.

5. An apparatus for driving capacitive display device according to claim 3, wherein the control signal generating means generates control signals increasing in voltage level along with the passing of time, and the impedance converting means is selected to possess the characteristic of decreasing in impedance during increasing in the voltage level of the control signal.

6. The apparatus of claim 3, wherein the modulation voltage of the control signal generating means is of a ramp waveform increasing in voltage level within the predetermined period.

7. A method for driving a capacitive display device, which includes a capacitive display layer intervening between a plurality of scanning side electrodes and a plurality of data side electrodes arranged in mutually intersecting perpendicular directions, said method comprising the steps of:

applying ramp data pulses, varied in pulse width corresponding to gradation of display data, to the plurality of data side electrodes; and applying writing pulses, sequentially, to each of the plurality of scanning side electrodes, wherein the pulse width of each of the ramp data pulses applied to the data electrodes are sequentially further varied in pulse width, beyond that corresponding to gradation display data, according to sequential location of a corresponding scanning electrode in the scanning sequence of the scanning electrodes, and wherein a degree of pulse width variation is selected so that picture elements corresponding to the same gradation of display data are identical in brightness.

8. A method for driving capacitive display device according to claim 7, wherein the sequential further variation of the pulse width is attained by sequentially varying a phase of a clock signal, in response to the scanning sequence of the scanning electrode, the clock signal supplying timing at which the data pulses are sequentially applied to data side electrodes.

9. An apparatus for driving capacitive display device comprising:

a first capacitive display layer intervening between a plurality of first electrodes and a plurality of second electrodes opposing said plurality of first electrodes;

first electrode driving means for periodically applying a predetermined first potential remaining at a substantially constant voltage level for a predetermined time duration, sequentially, to the plurality of first electrodes;

second electrode driving means for applying ramp pulses, rising in voltage level over a predetermined time duration, each of a varied pulse width persisting for a driving period, correlated to a predetermined gradation, to each of the plurality of second electrodes;

detecting means for detecting positional location of each of the plurality of first electrodes, sequentially, relative to the second electrode driving means; and delay means for delaying each pulse width varied ramp pulse by an amount based upon the detected positional location of each corresponding first electrode, sequentially, so that the persisting driving period for each of the plurality of second electrodes, at a position remote from the second electrode driving means, is longer in time than the persisting driving period of the second electrodes at a position closer to the second driving means, for each gradation based upon each detected positional location, to alleviate line resistance effects and create uniform display for each gradation level.

10. An apparatus for driving the capacitive display device according to claim 9, wherein the second electrode driving means sequentially varies the pulse width from shorter to longer so that display brightness for each of the plurality of electrodes may be approximately equal for an equal gradation level.

11. A method for driving a capacitive display device, which includes a capacitive display layer intervening between a plurality of scanning side electrodes and a plurality of data side electrodes arranged in mutually intersecting perpendicular directions, said method comprising the steps of:

providing each of the plurality of data side electrodes with a ramp modulation voltage, via one of a plurality of data side electrode drivers, varied in pulse width depending on gradation display data from one side of the plurality of electrodes with respect to another side of the plurality of electrodes, being mutually opposite with respect an extending direction of the plurality of data side electrodes;

providing the plurality of scanning side electrodes, sequentially, with a substantially rectangular pulse writing voltage;

detecting positional location of each of the plurality of first electrodes, sequentially, relative to each of the plurality of data side electrode drivers; and delaying each pulse width varied ramp modulation voltage by an amount based upon the detected positional location of each corresponding first electrode, sequentially, so that the pulse width is gradually decreased or increased with respect to the ramp modulation voltage data pulse, which sequentially increases in voltage level over time, applied from each one of the plurality of data side electrodes based upon the detected positional location, the pulse width being gradually increased or decreased based upon the detected positional location so as to maintain a complementary relationship between the pulse width variations with respect to the ramp modulation voltage applied to the one side and the ramp modulation voltage applied to the other side of the plurality of data side electrodes, a degree of such change being selected so that picture elements corresponding to the same display data may be identical in brightness.

12. An apparatus for driving a capacitive display device comprising:

a capacitive display layer intervening between a plurality of first electrodes to be scanned and a plurality of second electrodes, extending in a perpendicular direction with respect to the plurality of first electrodes and divided into a plurality of individual groups;

first electrode driving means for driving the plurality of first electrodes by periodically applying predetermined potentials, sequentially, to the plurality of first electrodes;

a plurality of second electrode driving means, one corresponding to each of the individual groups of the plurality of second electrodes, each for applying a ramp pulse with a pulse width persisting for the driving period corresponding to a predetermined gradation and a voltage level gradually increasing for the driving period, to the plurality of second electrodes, and wherein predetermined second potentials, of which a potential difference from the predetermined first potential activates the capacitive display layer, is applied;

detecting means for detecting positional location of each of the plurality of first electrodes, sequentially, relative to each of the plurality of second electrode driving means; and a plurality of delay means, one corresponding to each of the plurality of second electrode driving means, each for delaying a corresponding one of the pulse width modulated varied ramp voltage by an amount based upon the detected positional location of each corresponding first electrode, sequentially the second electrode driving means corresponding to a first group of the plurality of individual groups and the second electrode driving means corresponding to another of the plurality of individual groups contain the second electrode driving means individually arranged at opposite ends of the second electrodes.

13. An apparatus for driving capacitive display device according to claim 12, wherein the second electrodes are divided into two individual groups, and each of the plurality of electrodes is connected to two second electrodes driving means in every line or plurality of lines.

14. An apparatus for driving a capacitive display device comprising:

a capacitive display layer disposed between a layer containing a plurality of data electrodes and a layer containing a plurality of scanning electrodes;

scanning electrode driving means for periodically applying a predetermined first potential remaining at substantially constant voltage level for a predetermined time duration, sequentially, to the plurality of scanning electrodes;

data electrode driving means including,
  a DC power supply,
  impedance converting means possessing an impedance corresponding to a control signal voltage level, connected in series between the DC power supply and the plurality of data electrodes, for varying the impedance between the DC power supply and the plurality of data electrodes,
  control signal generating means for generating control signals including a modulation voltage and corresponding current, the modulation voltage and corresponding current both sequentially varying in magnitude along a time duration within a predetermined period, dependent upon a desired gradation, and for applying the control signals to the impedance converting means to vary the impedance in accordance with the control signals, and switching means for passing the current from the impedance converting means to the capacitive display layer through the plurality of data electrodes, only for a time corresponding to the desired gradation in each predetermined period, and for
  switching off the current for the remaining time in each predetermined period; the data electrode driving means further including,
  detecting means for detecting positional location of each of the plurality of scanning electrodes, sequentially, relative to the data electrode driving means, and
  delay means for delaying each control signal by an amount based upon the detected positional location of each corresponding scanning electrode, sequentially, so that the persisting driving period for each of the plurality of second electrodes, at a position remote from the second electrode driving means, is longer in time than the persisting driving period of the second electrodes at a position closer to the second driving means, for each gradation based upon each detected positional location, to alleviate line resistance effects and create uniform display for each gradation level.

15. The apparatus of claim 14, wherein the modulation voltage of the control signal generating means is of a ramp waveform increasing in voltage level within the predetermined period.

* * * * *